United States Patent
Cheng et al.

(10) Patent No.: US 10,129,856 B2
(45) Date of Patent: Nov. 13, 2018

(54) UPLINK CONTROL INFORMATION TRANSMISSION METHOD, BASE STATION, AND USER EQUIPMENT

(71) Applicant: HUAWEI TECHNOLOGIES CO., LTD., Shenzhen (CN)

(72) Inventors: Yan Cheng, Beijing (CN); David Jean-Marie Mazzarese, Beijing (CN); Lixia Xue, Beijing (CN); Brian Classon, Chicago, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 257 days.

(21) Appl. No.: 15/142,442

(22) Filed: Apr. 29, 2016

(65) Prior Publication Data

US 2016/0249340 A1 Aug. 25, 2016

Related U.S. Application Data

(63) Continuation of application No. PCT/CN2013/086431, filed on Nov. 1, 2013.

(51) Int. Cl.
*H04W 72/04* (2009.01)
*H04L 1/18* (2006.01)
(Continued)

(52) U.S. Cl.
CPC ....... *H04W 72/0406* (2013.01); *H04L 1/1812* (2013.01); *H04L 1/1861* (2013.01);
(Continued)

(58) Field of Classification Search
CPC ............................ H04L 1/1812; H04L 5/0055
(Continued)

(56) References Cited

U.S. PATENT DOCUMENTS

2012/0008600 A1 1/2012 Marinier et al.
2012/0155337 A1 6/2012 Park
(Continued)

FOREIGN PATENT DOCUMENTS

CN 103209061 A 7/2013
CN 103270710 A 8/2013
(Continued)

OTHER PUBLICATIONS

Japanese Office Action dated May 16, 2017 in corresponding Japanese Patent Application No. 2016-527197.
(Continued)

*Primary Examiner* — John J. Lee
(74) *Attorney, Agent, or Firm* — Staas & Halsey LLP

(57) ABSTRACT

Embodiments of the present invention provide an uplink control information transmission method, a base station, and user equipment. The method includes: receiving, by UE in a downlink subframe N, a downlink control channel sent by a base station; sending, by the UE, a hybrid automatic repeat request-acknowledgement corresponding to the downlink control channel to the base station in an uplink subframe N+4 by using a PUCCH, where when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, where a duplexing mode of the first serving cell is different from a duplexing mode of the second serving cell.

15 Claims, 14 Drawing Sheets

(51) Int. Cl.
H04L 5/00 (2006.01)
H04L 5/14 (2006.01)

(52) U.S. Cl.
CPC .......... H04L 5/0055 (2013.01); H04L 5/1415 (2013.01); H04W 72/0473 (2013.01)

(58) Field of Classification Search
USPC .................. 455/452.1, 509, 422.1, 67.11
See application file for complete search history.

(56) References Cited

U.S. PATENT DOCUMENTS

| 2014/0133420 A1* | 5/2014 | Oizumi | H04L 5/0007 370/329 |
| 2015/0358139 A1* | 12/2015 | Li | H04W 72/08 370/252 |
| 2016/0329994 A1* | 11/2016 | Yang | H04L 1/1861 |

FOREIGN PATENT DOCUMENTS

| EP | 3 029 874 A1 | 6/2016 |
| TW | 201132183 A1 | 9/2011 |
| WO | 2009/131345 A1 | 10/2009 |
| WO | 2011/041623 A1 | 4/2011 |
| WO | 2012/070839 A2 | 5/2012 |
| WO | 2013/016638 A1 | 1/2013 |

OTHER PUBLICATIONS

"3$^{rd}$ Generation Partnership Project; Technical Specification Group Radio Access Network; Evolved Universal Terrestrial Radio Access (E-UTRA); Physical layer procedures (Release 11)," 3GPP, TS 36.213, 3GPP, Sep. 2013, V11.4.0, pp. 19-22.
Samsung, "HARQ operation for TDD plus FDD CA," 3GPP TSG-RAN WG1 #74bis, 3GPP, Oct. 11, 2013, R1-134167.
ZTE, "Issues for TDD-FDD CA," 3GPP TSG-RAN WG1 #74bis, 3GPP, Oct. 11, 2013, R1-134851.
"HARQ timing for TDD_FDD carrier aggregation", 3GPP TSG RAN WG1 Meeting #74bis, R1-134396, Oct. 7-11, 2013, Guangzhou, China, pp. 1-6.
International Search Report dated Aug. 4, 2014 in corresponding International Patent Application No. PCT/CN2013/086431.
Extended European Search Report dated Oct. 13, 2016 in corresponding European Patent Application No. 13896690.8.
International Search Report dated Aug. 4, 2014, in corresponding International Application No. PCT/CN2013/086431.
Chinese Office Action dated Feb. 6, 2018, in corresponding Chinese Patent Application No. 201380003141.2, 8 pgs.

* cited by examiner

UPLINK CONTROL INFORMATION TRANSMISSION METHOD, BASE STATION, AND USER EQUIPMENT

CROSS-REFERENCE TO RELATED APPLICATION

This application is a continuation of International Application No. PCT/CN2013/086431, filed on Nov. 1, 2013, which is incorporated herein by reference in its entirety.

TECHNICAL FIELD

Embodiments of the present invention relate to data communications technologies, and in particular, to an uplink control information transmission method, a base station, and user equipment.

BACKGROUND

A 3rd Generation Partnership Project Long Term Evolution (3GPP LTE) system includes two working modes: frequency division duplexing (Frequency Division Duplexing, FDD for short) and time division duplexing (Time Division Duplexing, TDD for short). In the 3GPP LTE system, to support hybrid automatic repeat, a terminal needs to feed back a hybrid automatic repeat request-acknowledgement (Hybrid Automatic Repeat request-Acknowledgement, HARQ-ACK for short) to a base station by using a physical uplink control channel (Physical Uplink Control Channel, PUCCH for short) and a physical uplink shared channel (Physical Uplink Shared Channel, PUSCH for short). When the terminal feeds back an acknowledgement (Acknowledgement, ACK for short) to the base station, it indicates that the terminal correctly receives a message. When the terminal feeds back a negative acknowledgement (Negative Acknowledgement, NACK for short) to the base station, it indicates incorrect receiving at the terminal, and the base station needs to perform retransmission.

In 3GPP LTE Rel 10/11, to satisfy a requirement of the International Telecommunication Union for the peak data rate of the 4th generation communications technology, carrier aggregation (Carrier Aggregation, CA for short) is introduced. Aggregated carriers are referred to as component carriers (Component Carrier, CC for short), and are also referred to as a serving cell. In the carrier aggregation technology, two or more component carriers are aggregated to provide higher bandwidth. In the LTE Rel-8/9, user equipment (UE) can access only one component carrier to perform data transceiving; while in the LTE-A, UE may access, according to capabilities of the UE and service requirements, multiple component carriers to perform data transceiving. In an existing carrier aggregation system, generally, carriers deployed on a same base station (Evolved NodeB, eNB for short) are aggregated, or carriers under a macro cell and a micro cell that have an ideal backhaul link (Backhaul) are aggregated. In an existing CA system, hybrid automatic repeat request-acknowledgement information is sent only on a primary carrier, and duplexing modes of aggregated component carriers are the same, and are FDD or TDD.

In a subsequent LTE system, carrier aggregation may evolve to support aggregation of different duplexing modes, that is, duplexing modes of aggregated component carriers may be different, for example, duplexing modes of some component carriers are FDD and duplexing modes of other component carriers are TDD. In an existing CA system, the HARQ-ACK is sent only on a primary carrier, and for aggregation of different duplexing modes, the primary carrier may be an FDD carrier or a TDD carrier. In this evolution direction, if the primary carrier is a TDD carrier and another component carrier is an FDD carrier, an HARQ-ACK corresponding to the FDD carrier also needs to be fed back on the TDD carrier. In an existing system, for the FDD carrier, HARQ-ACK timing of the FDD carrier is n+4, that is, an HARQ-ACK corresponding to a PDSCH transmitted in a downlink subframe n is fed back in an uplink subframe n+4. However, if an HARQ-ACK corresponding to an FDD carrier is fed back on a TDD carrier, because only some subframes of a radio frame on the TDD carrier are used for uplink transmission, if HARQ-ACK timing of existing FDD is used, for downlink subframes on some FDD carriers, there is no corresponding uplink subframe used to feed back an HARQ-ACK. If these downlink subframes are not scheduled, resources may be wasted. Therefore, how to transmit an HARQ-ACK during aggregation of carriers of different duplexing modes needs to be resolved.

SUMMARY

Embodiments of the present invention provide an uplink control information transmission method, a base station, and user equipment, so as to resolve a problem of how to transmit an HARQ-ACK during aggregation of carriers of duplexing modes.

A first aspect of the present invention provides an uplink control information transmission method, including:

receiving, by user equipment UE in a downlink subframe N, a downlink control channel sent by a base station, where the downlink control channel is carried on a first serving cell of the UE; and sending, by the UE, a hybrid automatic repeat request-acknowledgement corresponding to the downlink control channel to the base station in an uplink subframe N+4 by using a physical uplink control channel PUCCH, where when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, where a duplexing mode of the first serving cell is different from a duplexing mode of the second serving cell, the sum of a quantity of uplink subframes included in the first uplink subframe set and a quantity of uplink subframes included in the second uplink subframe set is equal to a quantity of subframes in a radio frame, and an uplink subframe included in the first uplink subframe set and an uplink subframe included in the second uplink subframe set correspond to different subframes in the radio frame.

In a first possible implementation manner of the first aspect of the present invention, when the duplexing mode of the first serving cell is time division duplexing TDD and the duplexing mode of the second serving cell is frequency division duplexing FDD, the uplink subframe included in the second uplink subframe set corresponds to an uplink subframe, in a radio frame, of the first serving cell and the uplink subframe included in the first uplink subframe set corresponds to the other uplink subframe, except the uplink subframe included in the second uplink subframe set, in the radio frame; or when the duplexing mode of the first serving cell is FDD and the duplexing mode of the second serving cell is TDD, the uplink subframe included in the first uplink subframe set corresponds to an uplink subframe, in a radio frame, of the first serving cell and the uplink subframe included in the second uplink subframe set corresponds to the other uplink subframe, except the uplink subframe included in the first uplink subframe set, in the radio frame.

With reference to the first aspect of the present invention and the first possible implementation manner of the first aspect, in a second possible implementation manner of the first aspect of the present invention, the downlink control channel is a physical downlink control channel PDCCH or an enhanced physical downlink control channel EPDCCH, and the downlink control channel is used to indicate physical downlink shared channel PDSCH transmission carried on the first serving cell or is used to indicate downlink semi-persistent scheduling SPS releasing; and when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

With reference to the first aspect of the present invention and the first and second possible implementation manners of the first aspect, in a third possible implementation manner of the first aspect of the present invention, before the sending, by the UE, a hybrid automatic repeat request-acknowledgement corresponding to the downlink control channel to the base station in an uplink subframe N+4 by using a physical uplink control channel PUCCH, the method further includes:

acquiring, by the UE, a PUCCH resource and/or a PUCCH transmit power of the PUCCH.

In a fourth possible implementation manner of the first aspect of the present invention, when the uplink subframe N+4 belongs to the first uplink subframe set, the acquiring, by the UE, a PUCCH resource of the PUCCH includes:

determining, by the UE, the PUCCH resource according to a transmit power control TPC command field in a downlink control information DCI format of the downlink control channel.

In a fifth possible implementation manner of the first aspect of the present invention, when the uplink subframe N+4 belongs to the second uplink subframe set, the acquiring, by the UE, a PUCCH transmit power of the PUCCH includes:

determining, by the UE, the PUCCH transmit power according to a transmit power control TPC command field in a downlink control information DCI format of the downlink control channel.

A second aspect of the present invention provides an uplink control information transmission method, including:

sending, by a base station, a downlink control channel to user equipment UE in a downlink subframe N, where the downlink control channel is carried on a first serving cell of the UE; and receiving, by the base station in an uplink subframe N+4, a hybrid automatic repeat request-acknowledgement that is sent by the UE by using a physical uplink control channel PUCCH and corresponds to the downlink control channel, where when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, where a duplexing mode of the first serving cell is different from a duplexing mode of the second serving cell, the sum of a quantity of uplink subframes included in the first uplink subframe set and a quantity of uplink subframes included in the second uplink subframe set is equal to a quantity of subframes in a radio frame, and an uplink subframe included in the first uplink subframe set and an uplink subframe included in the second uplink subframe set correspond to different subframes in the radio frame.

In a first possible implementation manner of the second aspect of the present invention, when the duplexing mode of the first serving cell is time division duplexing TDD and the duplexing mode of the second serving cell is frequency division duplexing FDD, the uplink subframe included in the second uplink subframe set corresponds to an uplink subframe, in a radio frame, of the first serving cell and the uplink subframe included in the first uplink subframe set corresponds to the other uplink subframe, except the uplink subframe included in the second uplink subframe set, in the radio frame; or when the duplexing mode of the first serving cell is FDD and the duplexing mode of the second serving cell is TDD, the uplink subframe included in the first uplink subframe set corresponds to an uplink subframe, in a radio frame, of the first serving cell and the uplink subframe included in the second uplink subframe set corresponds to the other uplink subframe, except the uplink subframe included in the first uplink subframe set, in the radio frame.

With reference to the second aspect of the present invention and the first possible implementation manner of the second aspect, in a second possible implementation manner of the second aspect of the present invention, the downlink control channel is a physical downlink control channel PDCCH or an enhanced physical downlink control channel EPDCCH, and the downlink control channel is used to indicate physical downlink shared channel PDSCH transmission carried on the first serving cell or is used to indicate downlink semi-persistent scheduling SPS releasing; and when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

A third aspect of the present invention provides an uplink control information transmission method, including:

receiving, by user equipment UE, a downlink control channel in a downlink subframe N, where the downlink control channel is carried on a first serving cell of the UE and a duplexing mode of the first serving cell is time division duplexing TDD; and sending, by the UE in an uplink subframe N+4 by using a physical uplink control channel PUCCH, a hybrid automatic repeat request-acknowledgement corresponding to the downlink control channel, where the PUCCH is carried on a second serving cell of the UE and a duplexing mode of the second serving cell is frequency division duplexing FDD.

In a first possible implementation manner of the third aspect of the present invention, the downlink control channel is a physical downlink control channel PDCCH or an enhanced physical downlink control channel EPDCCH, and the downlink control channel is used to indicate physical downlink shared channel PDSCH transmission carried on the first serving cell or is used to indicate downlink semi-persistent scheduling SPS releasing; and when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

With reference to the third aspect of the present invention and the first possible implementation manner of the third aspect, in a second possible implementation manner of the third aspect of the present invention, before the sending, by the UE in an uplink subframe N+4 by using a physical uplink control channel PUCCH, a hybrid automatic repeat request-acknowledgement corresponding to the downlink control channel, the method further includes:

acquiring, by the UE, a PUCCH resource of the PUCCH.

In a third possible implementation manner of the third aspect of the present invention, the acquiring, by the UE, a PUCCH resource of the PUCCH includes:

determining, by the UE, the PUCCH resource according to a downlink allocation indication DAI or a transmit power control TPC command in a downlink control information DCI format of the downlink control channel.

With reference to the third aspect of the present invention and the first to third possible implementation manners of the third aspect, in a fourth possible implementation manner of the third aspect of the present invention, the first serving cell is a primary serving cell of the UE and the second serving cell is a secondary serving cell of the UE.

In a fifth possible implementation manner of the third aspect of the present invention, the second serving cell is an FDD secondary serving cell, having a smallest cell index, of the UE, or the second serving cell is a secondary serving cell, used to transmit the PUCCH, indicated by higher layer signaling.

A fourth aspect of the present invention provides an uplink control information transmission method, including:

sending, by a base station, a downlink control channel to user equipment UE in a downlink subframe N, where the downlink control channel is carried on a first serving cell of the UE, a duplexing mode of the first serving cell is time division duplexing TDD, and a downlink allocation indication DAI or a transmit power control TPC command in a downlink control information DCI format of the downlink control channel is used to indicate a physical uplink control channel PUCCH resource; and receiving, by the base station in an uplink subframe N+4 according to the PUCCH resource, a hybrid automatic repeat request-acknowledgement that is sent by the UE by using a PUCCH and corresponds to the downlink control channel, where the PUCCH is carried on a second serving cell of the UE and a duplexing mode of the second serving cell is frequency division duplexing FDD.

In a first possible implementation manner of the fourth aspect of the present invention, the downlink control channel is a physical downlink control channel PDCCH or an enhanced physical downlink control channel EPDCCH, and the downlink control channel is used to indicate physical downlink shared channel PDSCH transmission carried on the first serving cell or is used to indicate downlink semi-persistent scheduling SPS releasing; and when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

With reference to the fourth aspect of the present invention and the first possible implementation manner of the fourth aspect, in a second possible implementation manner of the fourth aspect of the present invention, the first serving cell is a primary serving cell of the UE and the second serving cell is a secondary serving cell of the UE.

In a third possible implementation manner of the fourth aspect of the present invention, the second serving cell is an FDD secondary serving cell, having a smallest cell index, of the UE, or the second serving cell is a secondary serving cell, used to transmit the PUCCH, indicated by the base station by using higher layer signaling.

A fifth aspect of the present invention provides an uplink control information transmission method, including:

receiving, by user equipment UE, a downlink control channel in a downlink subframe N, where the downlink control channel is carried on a first serving cell of the UE and the downlink control channel is a physical downlink control channel PDCCH or an enhanced physical downlink control channel EPDCCH;

when a hybrid automatic repeat request-acknowledgement corresponding to the downlink control channel is carried on a second serving cell of the UE, determining, by the UE, a physical uplink control channel PUCCH resource according to a transmit power control TPC command field in a downlink control information DCI format of the downlink control channel;

when the hybrid automatic repeat request-acknowledgement corresponding to the downlink control channel is carried on the first serving cell, determining, by the UE, a transmit power of a PUCCH according to the transmit power control TPC command field in the downlink control information DCI format of the downlink control channel, where a duplexing mode of the first serving cell is different from a duplexing mode of the second serving cell; and sending, by the UE by using the PUCCH according to the PUCCH resource or the transmit power of the PUCCH, the hybrid automatic repeat request-acknowledgement corresponding to the downlink control channel.

In a first possible implementation manner of the fifth aspect of the present invention, the downlink control channel is used to indicate physical downlink shared channel PDSCH transmission carried on the first serving cell or is used to indicate downlink semi-persistent scheduling SPS releasing; and when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

With reference to the fifth aspect of the present invention and the first possible implementation manner of the fifth aspect, in a second possible implementation manner of the fifth aspect of the present invention, the first serving cell is a primary serving cell of the UE, a duplexing mode of the first serving cell is time division duplexing TDD, a duplexing mode of the second serving cell is frequency division duplexing FDD, and the second serving cell is an FDD secondary serving cell, having a smallest cell index, of the UE.

With reference to the fifth aspect of the present invention and the first possible implementation manner of the fifth aspect, in a third possible implementation manner of the fifth aspect of the present invention, the first serving cell is a primary serving cell of the UE, a duplexing mode of the first serving cell is time division duplexing TDD, a duplexing mode of the second serving cell is frequency division duplexing FDD, and the second serving cell is a secondary serving cell, used to transmit the PUCCH, indicated by higher layer signaling.

A sixth aspect of the present invention provides an uplink control information transmission method, including:

sending, by a base station, a downlink control channel to user equipment UE in a downlink subframe N, where the downlink channel is carried on a first serving cell of the UE and the downlink control channel is a physical downlink control channel PDCCH or an enhanced physical downlink control channel EPDCCH;

when a hybrid automatic repeat request-acknowledgement corresponding to the downlink control channel is carried on a second serving cell of the UE, indicating, by the base station, a physical uplink control channel PUCCH resource by using a transmit power control TPC command field in a downlink control information DCI format of the downlink control channel;

when the hybrid automatic repeat request-acknowledgement corresponding to the downlink control channel is carried on the first serving cell, indicating, by the base station, a transmit power of a PUCCH by using a transmit power control TPC command field in the downlink control information DCI format of the downlink control channel, where a duplexing mode of the first serving cell is different from a duplexing mode of the second serving cell; and receiving, by the base station according to the PUCCH resource, the hybrid automatic repeat request-acknowledgement that is sent by the UE and corresponds to the downlink control channel.

In a first possible implementation manner of the sixth aspect of the present invention, the downlink control channel is used to indicate physical downlink shared channel PDSCH transmission carried on the first serving cell or is used to indicate downlink semi-persistent scheduling SPS releasing; and when the downlink control channel is used to indicate the physical downlink shared channel PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the downlink semi-persistent scheduling SPS releasing, the hybrid automatic repeat request-acknowledgement corresponding to the downlink control channel is specifically a hybrid automatic repeat request-acknowledgement corresponding to the downlink control channel indicating the downlink semi-persistent scheduling SPS releasing.

With reference to the sixth aspect of the present invention and the first possible implementation manner of the sixth aspect, in a second possible implementation manner of the sixth aspect of the present invention, the first serving cell is a primary serving cell of the UE, a duplexing mode of the first serving cell is time division duplexing TDD, a duplexing mode of the second serving cell is frequency division duplexing FDD, and the second serving cell is an FDD secondary serving cell, having a smallest cell index, of the UE.

With reference to the sixth aspect of the present invention and the first possible implementation manner of the sixth aspect, in a third possible implementation manner of the sixth aspect of the present invention, the first serving cell is a primary serving cell of the UE, a duplexing mode of the first serving cell is time division duplexing TDD, a duplexing mode of the second serving cell is frequency division duplexing FDD, and the second serving cell is a secondary serving cell, used to transmit the PUCCH, indicated by higher layer signaling.

A seventh aspect of the present invention provides user equipment UE, including:

a receiving module, configured to receive, in a downlink subframe N, a downlink control channel sent by a base station, where the downlink control channel is carried on a first serving cell of the UE; and a sending module, configured to send a hybrid automatic repeat request-acknowledgement corresponding to the downlink control channel to the base station in an uplink subframe N+4 by using a physical uplink control channel PUCCH, where when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, where a duplexing mode of the first serving cell is different from a duplexing mode of the second serving cell, the sum of a quantity of uplink subframes included in the first uplink subframe set and a quantity of uplink subframes included in the second uplink subframe set is equal to a quantity of subframes in a radio frame, and an uplink subframe included in the first uplink subframe set and an uplink subframe included in the second uplink subframe set correspond to different subframes in the radio frame.

In a first possible implementation manner of the seventh aspect of the present invention, when the duplexing mode of the first serving cell is time division duplexing TDD and the duplexing mode of the second serving cell is frequency division duplexing FDD, the uplink subframe included in the second uplink subframe set corresponds to an uplink subframe, in a radio frame, of the first serving cell and the uplink subframe included in the first uplink subframe set corresponds to the other uplink subframe, except the uplink subframe included in the second uplink subframe set, in the radio frame; or when the duplexing mode of the first serving cell is FDD and the duplexing mode of the second serving cell is TDD, the uplink subframe included in the first uplink subframe set corresponds to an uplink subframe, in a radio frame, of the first serving cell and the uplink subframe included in the second uplink subframe set corresponds to the other uplink subframe, except the uplink subframe included in the first uplink subframe set, in the radio frame.

With reference to the seventh aspect of the present invention and the first possible implementation manner of the seventh aspect, in a second possible implementation manner of the seventh aspect of the present invention, the downlink control channel is a physical downlink control channel PDCCH or an enhanced physical downlink control channel EPDCCH, and the downlink control channel is used to indicate physical downlink shared channel PDSCH transmission carried on the first serving cell or is used to indicate downlink semi-persistent scheduling SPS releasing; and when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

With reference to the seventh aspect of the present invention and the first and second possible implementation manners of the seventh aspect, in a third possible implementation manner of the seventh aspect of the present invention, the user equipment further includes:

an acquiring module, configured to acquire a PUCCH resource and/or a PUCCH transmit power of the PUCCH.

In a fourth possible implementation manner of the seventh aspect of the present invention, when the uplink subframe N+4 belongs to the first uplink subframe set, the acquiring module is specifically configured to:

determine the PUCCH resource according to a transmit power control TPC command field in a downlink control information DCI format of the downlink control channel.

In a fifth possible implementation manner of the seventh aspect of the present invention, when the uplink subframe N+4 belongs to the second uplink subframe set, the acquiring module is specifically configured to:

determine the PUCCH transmit power according to the transmit power control TPC command field in the downlink control information DCI format of the downlink control channel.

An eighth aspect of the present invention provides a base station, including:

a sending module, configured to send a downlink control channel to user equipment UE in a downlink subframe N, where the downlink control channel is carried on a first serving cell of the UE; and a receiving module, configured to receive, in an uplink subframe N+4, a hybrid automatic repeat request-acknowledgement that is sent by the UE by using a physical uplink control channel PUCCH and corresponds to the downlink control channel, where when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, where a duplexing mode of the first serving cell is different from a duplexing mode of the second serving cell, the sum of a quantity of uplink subframes included in the first uplink subframe set and a quantity of uplink subframes included in the second uplink subframe set is equal to a quantity of subframes in a radio frame, and an uplink subframe included in the first uplink subframe set and an uplink subframe included in the second uplink subframe set correspond to different subframes in the radio frame.

In a first possible implementation manner of the eighth aspect of the present invention, when the duplexing mode of the first serving cell is time division duplexing TDD and the duplexing mode of the second serving cell is frequency division duplexing FDD, the uplink subframe included in the second uplink subframe set corresponds to an uplink subframe, in a radio frame, of the first serving cell and the uplink subframe included in the first uplink subframe set corresponds to the other uplink subframe, except the uplink subframe included in the second uplink subframe set, in the radio frame; or when the duplexing mode of the first serving cell is FDD and the duplexing mode of the second serving cell is TDD, the uplink subframe included in the first uplink subframe set corresponds to an uplink subframe, in a radio frame, of the first serving cell and the uplink subframe included in the second uplink subframe set corresponds to the other uplink subframe, except the uplink subframe included in the first uplink subframe set, in the radio frame.

With reference to the eighth aspect of the present invention and the first possible implementation manner of the eighth aspect, in a second possible implementation manner of the eighth aspect of the present invention, the downlink control channel is a physical downlink control channel PDCCH or an enhanced physical downlink control channel EPDCCH, and the downlink control channel is used to indicate physical downlink shared channel PDSCH transmission carried on the first serving cell or is used to indicate downlink semi-persistent scheduling SPS releasing; and when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

A ninth aspect of the present invention provides user equipment, including:

a receiving module, configured to receive a downlink control channel in a downlink subframe N, where the downlink control channel is carried on a first serving cell of the UE and a duplexing mode of the first serving cell is time division duplexing TDD; and a sending module, configured to send, in an uplink subframe N+4 by using a physical uplink control channel PUCCH, a hybrid automatic repeat request-acknowledgement corresponding to the downlink control channel, where the PUCCH is carried on a second serving cell of the UE and a duplexing mode of the second serving cell is frequency division duplexing FDD.

In a first possible implementation manner of the ninth aspect of the present invention, the downlink control channel is a physical downlink control channel PDCCH or an enhanced physical downlink control channel EPDCCH, and the downlink control channel is used to indicate physical downlink shared channel PDSCH transmission carried on the first serving cell or is used to indicate downlink semi-persistent scheduling SPS releasing; and when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

With reference to the ninth aspect of the present invention and the first possible implementation manner of the ninth aspect, in a second possible implementation manner of the ninth aspect of the present invention, the user equipment further includes:

an acquiring module, configured to acquire a PUCCH resource of the PUCCH.

In a third possible implementation manner of the ninth aspect of the present invention, the acquiring module is specifically configured to:

determine the PUCCH resource according to a downlink allocation indication DAI or a transmit power control TPC command in a downlink control information DCI format of the downlink control channel.

With reference to the ninth aspect of the present invention and the first to the third possible implementation manners of the ninth aspect, in a fourth possible implementation manner of the ninth aspect of the present invention, the first serving cell is a primary serving cell of the UE and the second serving cell is a secondary serving cell of the UE.

In a fifth possible implementation manner of the ninth aspect of the present invention, the second serving cell is an FDD secondary serving cell, having a smallest cell index, of the UE, or the second serving cell is a secondary serving cell, used to transmit the PUCCH, indicated by higher layer signaling.

A tenth aspect of the present invention provides a base station, including:

a sending module, configured to send a downlink control channel to user equipment UE in a downlink subframe N, where the downlink control channel is carried on a first serving cell of the UE, a duplexing mode of the first serving cell is time division duplexing TDD, and a downlink allocation indication DAI or a transmit power control TPC command in a downlink control information DCI format of the downlink control channel is used to indicate a physical uplink control channel PUCCH resource; and a receiving module, configured to receive, in an uplink subframe N+4 according to the PUCCH resource, a hybrid automatic repeat request-acknowledgement that is sent by the UE by using a PUCCH and corresponds to the downlink control channel, where the PUCCH is carried on a second serving cell of the UE and a duplexing mode of the second serving cell is frequency division duplexing FDD.

In a first possible implementation manner of the tenth aspect of the present invention, the downlink control channel is a physical downlink control channel PDCCH or an enhanced physical downlink control channel EPDCCH, and the downlink control channel is used to indicate physical downlink shared channel PDSCH transmission carried on the first serving cell or is used to indicate downlink semi-persistent scheduling SPS releasing; and when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

With reference to the tenth aspect of the present invention and the first possible implementation manner of the tenth aspect, in a second possible implementation manner of the tenth aspect of the present invention, the first serving cell is a primary serving cell of the UE and the second serving cell is a secondary serving cell of the UE.

In a third possible implementation manner of the tenth aspect of the present invention, the second serving cell is an FDD secondary serving cell, having a smallest cell index, of the UE, or the second serving cell is a secondary serving cell, used to transmit the PUCCH, indicated by the base station by using higher layer signaling.

An eleventh aspect of the present invention provides user equipment UE, including:

a receiving module, configured to receive a downlink control channel in a downlink subframe N, where the downlink control channel is carried on a first serving cell of the UE and the downlink control channel is a physical downlink control channel PDCCH or an enhanced physical downlink control channel EPDCCH;

a determining module, configured to: when a hybrid automatic repeat request-acknowledgement corresponding to the downlink control channel is carried on a second serving cell of the UE, determine, by the UE, a physical uplink control channel PUCCH resource according to a transmit power control TPC command field in a downlink control information DCI format of the downlink control channel; and when the hybrid automatic repeat request-acknowledgement corresponding to the downlink control channel is carried on the first serving cell, determine, by the UE, a transmit power of a PUCCH according to the transmit power control TPC command field in the downlink control information DCI format of the downlink control channel, where a duplexing mode of the first serving cell is different from a duplexing mode of the second serving cell; and a sending module, configured to send, by using the PUCCH according to the PUCCH resource or the transmit power of the PUCCH, the hybrid automatic repeat request-acknowledgement corresponding to the downlink control channel.

In a first possible implementation manner of the eleventh aspect of the present invention, the downlink control channel is used to indicate physical downlink shared channel PDSCH transmission carried on the first serving cell or is used to indicate downlink semi-persistent scheduling SPS releasing; and when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

With reference to the eleventh aspect of the present invention and the first possible implementation manner of the eleventh aspect, in a second possible implementation manner of the eleventh aspect of the present invention, the first serving cell is a primary serving cell of the UE, a duplexing mode of the first serving cell is time division duplexing TDD, a duplexing mode of the second serving cell is frequency division duplexing FDD, and the second serving cell is an FDD secondary serving cell, having a smallest cell index, of the UE.

With reference to the eleventh aspect of the present invention and the first possible implementation manner of the eleventh aspect, in a third possible implementation manner of the eleventh aspect of the present invention, the first serving cell is a primary serving cell of the UE, a duplexing mode of the first serving cell is time division duplexing TDD, a duplexing mode of the second serving cell is frequency division duplexing FDD, and the second serving cell is a secondary serving cell, used to transmit the PUCCH, indicated by higher layer signaling.

A twelfth aspect of the present invention provides a base station, including:

a sending module, configured to send a downlink control channel to user equipment UE in a downlink subframe N, where the downlink channel is carried on a first serving cell of the UE and the downlink control channel is a physical downlink control channel PDCCH or an enhanced physical downlink control channel EPDCCH;

an indication module, configured to: when a hybrid automatic repeat request-acknowledgement corresponding to the downlink control channel is carried on a second serving cell of the UE, indicate a physical uplink control channel PUCCH resource by using a transmit power control TPC command field in a downlink control information DCI format of the downlink control channel; and when the hybrid automatic repeat request-acknowledgement corresponding to the downlink control channel is carried on the first serving cell, indicate a transmit power of a PUCCH by using the transmit power control TPC command field in the downlink control information DCI format of the downlink control channel, where a duplexing mode of the first serving cell is different from a duplexing mode of the second serving cell; and a receiving module, configured to receive, according to the PUCCH resource, the hybrid automatic repeat request-acknowledgement that is sent by the UE and corresponds to the downlink control channel.

In a first possible implementation manner of the twelfth aspect of the present invention, the downlink control channel is used to indicate physical downlink shared channel PDSCH transmission carried on the first serving cell or is used to indicate downlink semi-persistent scheduling SPS releasing; and when the downlink control channel is used to indicate the physical downlink shared channel PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the downlink semi-persistent scheduling SPS releasing, the hybrid automatic repeat request-acknowledgement corresponding to the downlink control channel is specifically a hybrid automatic repeat request-acknowledgement corresponding to the downlink control channel indicating the downlink semi-persistent scheduling SPS releasing.

With reference to the twelfth aspect of the present invention and the first possible implementation manner of the twelfth aspect, in a second possible implementation manner of the twelfth aspect of the present invention, the first serving cell is a primary serving cell of the UE, a duplexing mode of the first serving cell is time division duplexing TDD, a duplexing mode of the second serving cell is frequency division duplexing FDD, and the second serving cell is an FDD secondary serving cell, having a smallest cell index, of the UE.

With reference to the twelfth aspect of the present invention and the first possible implementation manner of the twelfth aspect, in a third possible implementation manner of the twelfth aspect of the present invention, the first serving cell is a primary serving cell of the UE, a duplexing mode of the first serving cell is time division duplexing TDD, a duplexing mode of the second serving cell is frequency division duplexing FDD, and the second serving cell is a secondary serving cell, used to transmit the PUCCH, indicated by higher layer signaling.

In the uplink control information transmission method, the base station, and the user equipment that are provided in the embodiments of the present invention, the UE receives, in a downlink subframe N, a downlink control channel sent by the base station, and sends a hybrid automatic repeat request-acknowledgement corresponding to the downlink control channel to the base station in an uplink subframe N+4 by using a physical uplink control channel PUCCH, where when the uplink subframe N+4 belongs to a first uplink subframe set, the PUCCH is carried on a second serving cell of the UE, and when the uplink subframe N+4 belongs to a second uplink subframe set, the PUCCH is carried on a first serving cell. By means of the foregoing method, a problem of how to transmit an HARQ-ACK during aggregation of carriers of different duplexing modes is resolved, so that all downlink subframes (including an FDD downlink subframe and a TDD downlink subframe) have corresponding uplink subframes used to feed back an HARQ-ACK, which improves resource utilization, and HARQ-ACK timing of an FDD carrier is not changed.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
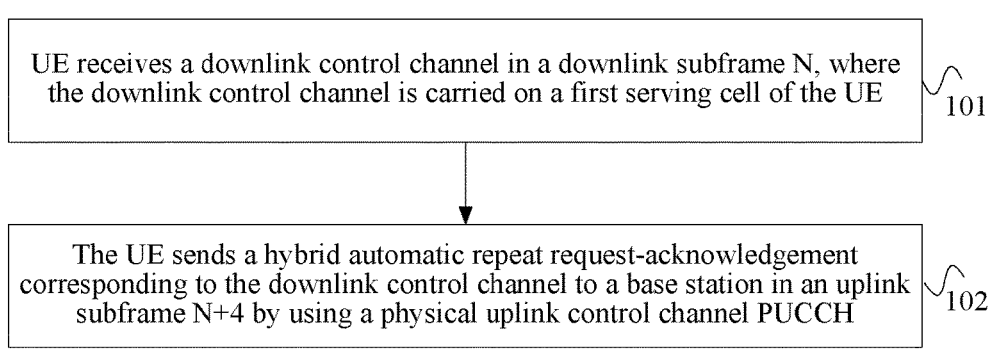
FIG. 1 is a flowchart of Embodiment 1 of an uplink control information transmission method according to the present invention.

FIG. 1 is a flowchart of Embodiment 1 of an uplink control information transmission method according to the present invention. As shown in FIG. 1, the method in this embodiment may include:

Step 101: UE receives a downlink control channel in a downlink subframe N, where the downlink control channel is carried on a first serving cell of the UE.

This step may be specifically: receiving, by the UE in the downlink subframe N, the downlink control channel sent by a base station, where the downlink control channel is carried on the first serving cell of the UE.

In all embodiments of the present invention, a serving cell corresponding to the user equipment (User Equipment, UE for short) may refer to a serving cell configured for the UE by a network side device (for example, a base station), a serving cell serving the UE, or a serving cell accessed by the UE. The serving cell corresponding to the UE includes a first serving cell and a second serving cell, where the first serving cell and the second serving cell may be a first serving cell and a second serving cell that are included in the serving cell configured for the UE by the base station, or may be a first serving cell and a second serving cell that are included in the serving cell accessed by the UE. It should be noted that, the serving cell corresponding to the UE may refer to a component carrier of the UE, the first serving cell may be referred to as a first component carrier, and the second serving cell may be referred to as a second component carrier.

In all embodiments of the present invention, a subframe number (n) refers to a sequence number of a subframe in multiple radio frames, and may be obtained in the following manner: numbering subframes in multiple radio frames from zero chronologically in a monotone increasing manner, that is, if the last subframe of a previous radio frame is numbered n', the first subframe of a current radio frame is n'+1. In addition, in the multiple radio frames, each subframe also has a subframe number in a corresponding radio frame of the subframe, that is, a subframe number of the subframe in the radio frame.

In this step, the UE receives, in the downlink subframe N, the downlink control channel carried on the first serving cell, where the first serving cell is a serving cell corresponding to the UE, the downlink control channel is a physical downlink control channel (Physical Downlink Control Channel, PDCCH for short) or an enhanced physical downlink control channel (Enhanced Physical Downlink Control Channel, EPDCCH for short), and the downlink control channel may be used to indicate a physical downlink shared channel PDSCH transmitted on the first serving cell, or the downlink control channel may be used to indicate PDSCH transmission carried on the first serving cell, or the downlink control channel may be used to indicate downlink semi-persistent scheduling (Semi-Persistent Scheduling, SPS for short) releasing. A downlink control information (Downlink Control Information, DCI for short) format of the downlink control channel may be one or more of a DCI format 1, a DCI format 1A, a DCI format 1B, a DCI format 1D, a DCI format 2A, a DCI format 2B, a DCI format 2C, and a DCI format 2D, which is not limited in the present invention.

Step 102: The UE sends, in an uplink subframe N+4 by using a physical uplink control channel PUCCH, a hybrid automatic repeat request-acknowledgement corresponding to the downlink control channel.

This step is specifically: sending, by the UE, the hybrid automatic repeat request-acknowledgement HARQ-ACK corresponding to the downlink control channel to the base station in the uplink subframe N+4 by using the physical uplink control channel PUCCH, that is, sending the hybrid automatic repeat request-acknowledgement corresponding to the downlink control channel received in step 101 to the base station.

Further, in this embodiment, when the uplink subframe N+4 belongs to a first uplink subframe set, the physical uplink control channel (Physical Uplink Control Channel, PUCCH for short) is carried on the second serving cell of the UE, and when the uplink subframe N+4 belongs to a second uplink subframe set, the PUCCH is carried on the first serving cell, where a duplexing mode of the first serving cell is different from a duplexing mode of the second serving cell, the sum of a quantity of uplink subframes included in the first uplink subframe set and a quantity of uplink subframes included in the second uplink subframe set is equal to a quantity of subframes in a radio frame, an uplink subframe included in the first uplink subframe set and an uplink subframe included in the second uplink subframe set correspond to different subframes in the radio frame.

Further, in this step, when the uplink subframe N+4 belongs to the first uplink subframe set, the PUCCH is carried on the second serving cell of the user equipment and a transmit power control TPC command field in the downlink control information DCI format of the downlink control channel indicates a PUCCH resource of the PUCCH, that is, the transmit power control TPC command field in the downlink control information DCI format of the downlink control channel in step 101 indicates the PUCCH resource of the PUCCH. In this case, the user equipment may determine the PUCCH resource of the PUCCH according to the transmit power control TPC command field in the downlink control information DCI format of the downlink control channel in step 101, and then, feed back, in the uplink subframe N+4 on the PUCCH by using the PUCCH resource, a hybrid automatic repeat request-acknowledgement HARQ-ACK of a physical downlink shared channel PDSCH corresponding to the downlink control channel in step 101. When the uplink subframe N+4 belongs to the second uplink subframe set, the PUCCH is carried on the first serving cell of the user equipment, that is, may be carried on the first serving cell in step 101, and a transmit power control TPC command field in the downlink control information DCI format of the downlink control channel in step 101 indicates a transmit power of the PUCCH. In this case, the user equipment may determine the transmit power of the PUCCH according to the transmit power control TPC command field in the downlink control information DCI format of the downlink control channel in step 101, and then, feed back, in the uplink subframe N+4 on the PUCCH by using the transmit power of the PUCCH, the hybrid automatic repeat request-acknowledgement HARQ-ACK of the physical downlink shared channel PDSCH corresponding to the downlink control channel in step 101.

Optionally, in this embodiment, before step 102, the method may further include the following step: acquiring, by the UE, the PUCCH resource and/or the PUCCH transmit power of the PUCCH. In this embodiment, the UE may acquire only the PUCCH resource or the PUCCH transmit power, or the UE may acquire both of the PUCCH resource and the PUCCH transmit power. In a feasible implementation manner, when the uplink subframe N+4 belongs to the first uplink subframe set, the PUCCH is carried on the second serving cell of the UE and the base station indicates the PUCCH resource of the PUCCH by using the transmit power control (Transmit Power Control, TPC for short) command field in the downlink control information DCI format of the downlink control channel, that is, the transmit power control TPC command field in the downlink control information DCI format of the downlink control channel in step 101 indicates the PUCCH resource of the PUCCH. In this case, the UE may determine the PUCCH resource of the PUCCH according to the transmit power control TPC command field in the downlink control information DCI format of the downlink control channel in step 101, and then, feed back, in the uplink subframe N+4 on the PUCCH by using the PUCCH resource, the hybrid automatic repeat request-acknowledgement (HARQ Hybrid Automatic Repeat request Acknowledgement, HARQ-ACK for short) corresponding to the downlink control channel in step 101. When the uplink subframe N+4 belongs to the second uplink subframe set, the PUCCH is carried on the first serving cell of the UE, that is, the PUCCH is carried on the first serving cell in step 101, and the TPC command field in the DCI format of the downlink control channel in step 101 may be used to determine the transmit power of the PUCCH. In this case, the UE may determine the transmit power of the PUCCH according to the TPC command field in the DCI format of the downlink control channel in step 101, and then, feed back, in the uplink subframe N+4 on the PUCCH by using the transmit power of the PUCCH, the hybrid automatic repeat request-acknowledgement message corresponding to the downlink control channel in step 101.

Further, in this embodiment, when the downlink control channel is used to indicate physical downlink shared channel (Physical Downlink Shared Channel, PDSCH for short) transmission carried on the first serving cell, the hybrid automatic repeat request-acknowledgement corresponding to the downlink control channel is specifically an HARQ-ACK of the PDSCH corresponding to the downlink control channel; and when the downlink control channel is used to indicate downlink semi-persistent scheduling SPS releasing, the hybrid automatic repeat request-acknowledgement corresponding to the downlink control channel is specifically an HARQ-ACK corresponding to the downlink control channel indicating the SPS releasing.

Further, in this embodiment, the duplexing mode of the first serving cell is different from the duplexing mode of the second serving cell. When the duplexing mode of the first serving cell is TDD and the duplexing mode of the second serving cell is FDD, an uplink subframe included in the second uplink subframe set corresponds to an uplink subframe, in a radio frame, of the first serving cell and an uplink subframe included in the first uplink subframe set corresponds to the other uplink subframe, except the uplink subframe included in the second uplink subframe set, in the radio frame. When the duplexing mode of the first serving cell is FDD and the duplexing mode of the second serving cell is TDD, the uplink subframe included in the first uplink subframe set corresponds to an uplink subframe, in a radio frame, of the first serving cell and the uplink subframe included in the second uplink subframe set corresponds to the other uplink subframe, except the uplink subframe included in the first uplink subframe set, in the radio frame.

Further, when the first serving cell is a primary serving cell of the UE, the second serving cell may be an FDD secondary serving cell, having a smallest cell index, of the UE, and the second serving cell may also be a secondary serving cell indicated by higher layer signaling in the secondary serving cell of the UE, and may be specifically a secondary serving cell, used to transmit the PUCCH, indicated by higher layer signaling in the secondary serving cell of the UE.

Figure 2:
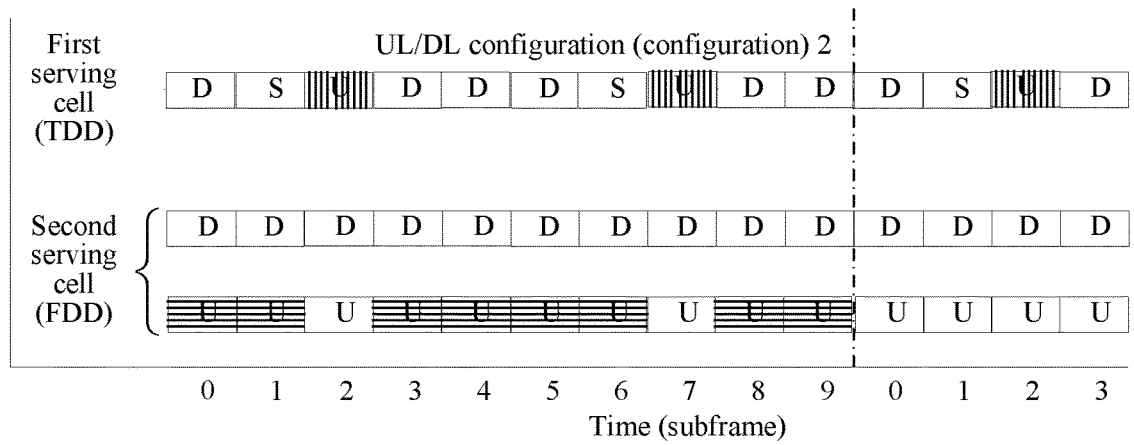
FIG. 2 is a schematic diagram of a PUCCH transmission mechanism according to the present invention.

Generally, there are 10 subframes in a radio frame; therefore, the sum of the quantity of the uplink subframes included in the first uplink subframe set and the quantity of the uplink subframes included in the second uplink subframe set may be 10. When the duplexing mode of the first serving cell is TDD and the duplexing mode of the second serving cell is frequency division duplexing FDD, the uplink subframe included in the second uplink subframe set corresponds to an uplink subframe, in a radio frame, of the first serving cell and the uplink subframe included in the first uplink subframe set corresponds to the other uplink subframe in the radio frame, that is, an uplink subframe, except the uplink subframe included in the second uplink subframe set, in the radio frame. For example, when an uplink-downlink configuration ratio of the first serving cell is a configuration ratio 2, the UE may transmit a PUCCH in a manner shown in FIG. 2. FIG. 2 is a schematic diagram of a PUCCH transmission mechanism in the present invention. The UE transmits the PUCCH on the first serving cell when the first serving cell corresponds to an uplink subframe, and transmits the PUCCH on the second serving cell when the first serving cell corresponds to a downlink subframe. In this case, the second uplink subframe set includes uplink subframes (subframes, marked by using vertical lines and corresponding to the first serving cell, in a radio frame in FIG. 2), corresponding to the first serving cell, in a radio frame and the first uplink subframe set includes the other uplink subframes (subframes, marked by using longitudinal lines and corresponding to the second serving cell, in the radio frame in FIG. 2) in the same radio frame, that is, the uplink subframes, except the uplink subframes included in the second uplink subframe set, in the radio frame.

In this embodiment of the present invention, for example, in an example shown in FIG. 2, when a primary carrier is a TDD carrier, for the FDD carrier and the TDD carrier, the HARQ-ACK may be fed back according to existing timing of the FDD carrier, that is, if the UE receives the control channel in the downlink subframe N, the UE feeds back an HARQ-ACK of the FDD carrier and/or the TDD carrier in the uplink subframe N+4; if the uplink subframe N+4 exactly corresponds to the uplink subframe of TDD, the HARQ-ACK is fed back by using the TDD carrier, and if the uplink subframe N+4 corresponds to a downlink subframe of TDD, the HARQ-ACK is fed back by using an FDD carrier. On one hand, all downlink subframes on the FDD carrier have corresponding uplink subframes used to feed back an HARQ-ACK, which improves resource utilization, and HARQ-ACK timing of an FDD carrier is not changed; on the other hand, for the TDD carrier, the HARQ-ACK is fed back according to existing timing of the FDD carrier, which avoids HARQ-ACK bundling and reduces an RTT delay of the TDD carrier.

In addition, in this embodiment of the present invention, when the uplink subframe N+4 belongs to the first uplink subframe set, the PUCCH is carried on the second serving cell of the user equipment and the transmit power control TPC command field in the downlink control information DCI format of the downlink control channel indicates the PUCCH resource of the PUCCH; when the uplink subframe N+4 belongs to the second uplink subframe set, the PUCCH is carried on the first serving cell of the user equipment and the transmit power control TPC command field in the downlink control information DCI format of the downlink control channel is used to determine the transmit power of the PUCCH. In this embodiment of the present invention, by means of the foregoing features, on one hand, the TPC command is carried on a downlink carrier corresponding carrier used to transmit a PUCCH, so that separate power control in this mode is implemented, and power control is easier; on the other hand, when the PUCCH is carried on the other serving cell, the TPC command field indicates the PUCCH resource, so that the UE can feed back an HARQ-ACK according to the PUCCH resource, and utilization of the PUCCH resource is improved by means of dynamic indication.

In the solution provided in this embodiment, UE receives, in a downlink subframe N, a downlink control channel sent by a base station, and sends a hybrid automatic repeat request-acknowledgement corresponding to the downlink control channel to the base station in an uplink subframe N+4 by using a physical uplink control channel PUCCH, where when the uplink subframe N+4 belongs to a first uplink subframe set, the PUCCH is carried on a second serving cell of the UE, and when the uplink subframe N+4 belongs to a second uplink subframe set, the PUCCH is carried on a first serving cell. By means of the foregoing method, a problem of how to transmit an HARQ-ACK during aggregation of carriers of different duplexing modes is resolved. Meanwhile, when the uplink subframe N+4 belongs to the first uplink subframe set, the PUCCH is carried on the second serving cell, and when the uplink subframe N+4 belongs to the second uplink subframe set, the PUCCH is carried on the first serving cell, so that all downlink subframes (including an FDD downlink subframe and a TDD downlink subframe) have corresponding uplink subframes used to feed back an HARQ-ACK, which improves resource utilization, and HARQ-ACK timing of an FDD carrier is not changed.

Figure 3:
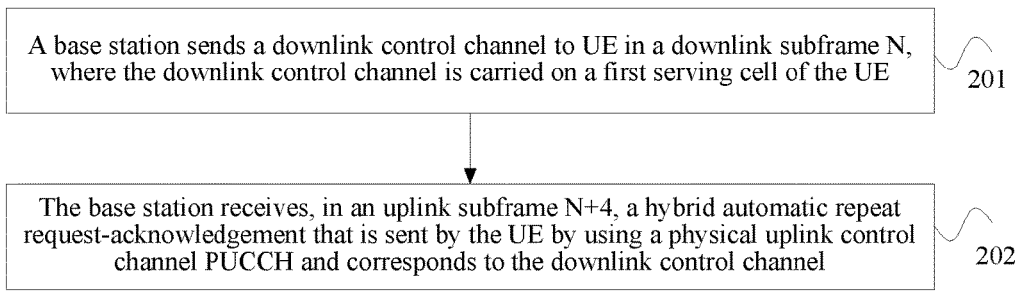
FIG. 3 is a flowchart of Embodiment 2 of an uplink control information transmission method according to the present invention.

FIG. 3 is a flowchart of Embodiment 2 of an uplink control information transmission method according to the present invention. As shown in FIG. 3, the method provided in this embodiment includes the following steps:

Step 201: A base station sends a downlink control channel to UE in a downlink subframe N, where the downlink control channel is carried on a first serving cell of the UE.

In this step, the base station sends the downlink control channel to the UE on the first serving cell in the downlink subframe N, where the downlink control channel is a physical downlink control channel PDCCH or an enhanced physical downlink control channel EPDCCH, and the downlink control channel is used to indicate PDSCH transmission carried on the first serving cell, or is used to indicate downlink semi-persistent scheduling SPS releasing. For other descriptions of this step, reference may be made to descriptions of step 101 in Embodiment 1, and details are not described herein again.

Step 202: The base station receives, in an uplink subframe N+4, a hybrid automatic repeat request-acknowledgement that is sent by the UE by using a physical uplink control channel PUCCH and corresponds to the downlink control channel.

In this embodiment, if the downlink control channel is used to indicate PDSCH transmission carried on the first serving cell, the hybrid automatic repeat request-acknowledgement corresponding to the downlink control channel is specifically a hybrid automatic repeat request-acknowledgement HARQ-ACK of a PDSCH corresponding to the downlink control channel; if the downlink control channel is used to indicate downlink semi-persistent scheduling SPS releasing, the hybrid automatic repeat request-acknowledgement corresponding to the downlink control channel is specifically a hybrid automatic repeat request-acknowledgement message HARQ-ACK corresponding to the downlink control channel indicating SPS releasing.

In this step, when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, where a duplexing mode of the first serving cell is different from a duplexing mode of the second serving cell, the sum of a quantity of uplink subframes included in the first uplink subframe set and a quantity of uplink subframes included in the second uplink subframe set is equal to a quantity of subframes in a radio frame, an uplink subframe included in the first uplink subframe set and an uplink subframe included in the second uplink subframe set correspond to different subframes in a radio frame.

In this step, when the uplink subframe N+4 belongs to the first uplink subframe set, the PUCCH is carried on the second serving cell of the UE and a transmit power control TPC command field in a downlink control information DCI format of the downlink control channel indicates a PUCCH resource of the PUCCH. In this case, the base station may indicate the PUCCH resource of the PUCCH by using the transmit power control TPC command field in the downlink control information DCI format of the downlink control channel in step 201, and then, receives, in the uplink subframe N+4 on the PUCCH by using the PUCCH resource, the hybrid automatic repeat request-acknowledgement message corresponding to the downlink control channel.

When the uplink subframe N+4 belongs to the second uplink subframe set, the PUCCH is carried on the first serving cell of the UE. In this case, the transmit power control TPC command field in the downlink control information DCI format of the downlink control channel in step 201 may be used by the UE to determine a transmit power of the PUCCH, and the base station may indicate the transmit power of the PUCCH according to the transmit power control TPC command field in the downlink control information DCI format of the downlink control channel.

In this embodiment, the duplexing mode of the first serving cell is different from the duplexing mode of the second serving cell. When the duplexing mode of the first serving cell is TDD and the duplexing mode of the second serving cell is FDD, an uplink subframe included in the second uplink subframe set corresponds to an uplink subframe, in a radio frame, of the first serving cell and an uplink subframe included in the first uplink subframe set corresponds to the other uplink subframe, except the uplink subframe included in the second uplink subframe set, in the radio frame. When the duplexing mode of the first serving cell is FDD and the duplexing mode of the second serving cell is TDD, the uplink subframe included in the first uplink subframe set corresponds to an uplink subframe, in a radio frame, of the first serving cell and the uplink subframe included in the second uplink subframe set corresponds to the other uplink subframe, except the uplink subframe included in the first uplink subframe set, in the radio frame.

When the first serving cell is a primary serving cell of the UE, the second serving cell may be an FDD secondary serving cell, having a smallest cell index, of the UE, and the second serving cell may also be a secondary serving cell indicated by higher layer signaling in the secondary serving cell of the UE, and may be specifically a secondary serving cell, used to transmit the PUCCH, indicated by the higher layer signaling in the secondary serving cell of the UE, that is, the secondary serving cell, used to transmit the PUCCH, indicated by the base station on the serving cell of the UE.

If there are 10 subframes in a radio frame, the sum of the quantity of the uplink subframes included in the first uplink subframe set and the quantity of the uplink subframes included in the second uplink subframe set may be 10. When the duplexing mode of the first serving cell is TDD and the duplexing mode of the second serving cell is frequency division duplexing FDD, the uplink subframe included in the second uplink subframe set corresponds to an uplink subframe, in a radio frame, of the first serving cell and the uplink subframe included in the first uplink subframe set corresponds to the other uplink subframe in the radio frame, that is, an uplink subframe, except the uplink subframe included in the second uplink subframe set, in the radio frame. For example, when an uplink-downlink configuration ratio of the first serving cell is a configuration ratio 2, the UE may transmit a PUCCH in a manner shown in FIG. 2. FIG. 2 is a schematic diagram of a PUCCH transmission mechanism in the present invention. The UE transmits the PUCCH on the first serving cell when the first serving cell corresponds to an uplink subframe, and transmits the PUCCH on the second serving cell when the first serving cell corresponds to a downlink subframe. In this case, the second uplink subframe set includes uplink subframes (subframes, marked by using vertical lines and corresponding to the first serving cell, in a radio frame in FIG. 2), corresponding to the first serving cell, in a radio frame and the first uplink subframe set includes the other uplink subframes (subframes, marked by using longitudinal lines and corresponding to the second serving cell, in the radio frame in FIG. 2) in the same radio frame, that is, the uplink subframes, except the uplink subframes included in the second uplink subframe set, in the radio frame.

In the method provided in this embodiment, a base station sends a downlink control channel in a downlink subframe N, and receives, in an uplink subframe N+4, a hybrid automatic repeat request-acknowledgement corresponding to the downlink control channel, where when the uplink subframe N+4 belongs to different uplink subframe sets, a PUCCH is carried on different serving cells, where when the uplink subframe N+4 belongs to a first uplink subframe set, the PUCCH is carried on a second serving cell of the UE, and when the uplink subframe N+4 belongs to a second uplink subframe set, the PUCCH is carried on a first serving cell, thereby resolving a problem of how to transmit an HARQ-ACK in a scenario of aggregating an FDD carrier and a TDD carrier. Meanwhile, when the uplink subframe N+4 belongs to the first uplink subframe set, the PUCCH is carried on the second serving cell of the UE, and when the uplink subframe N+4 belongs to the second uplink subframe set, the PUCCH is carried on the first serving cell, so that each subframe may be used to feed back an HARQ-ACK, and all downlink subframes on the FDD carrier have corresponding uplink subframes used to feed back an HARQ-ACK, which improves resource utilization, and HARQ-ACK timing of an FDD carrier is not changed. Other beneficial effects of this embodiment of the present invention are the same as that of Embodiment 1, and details are not described herein again.

Figure 4:
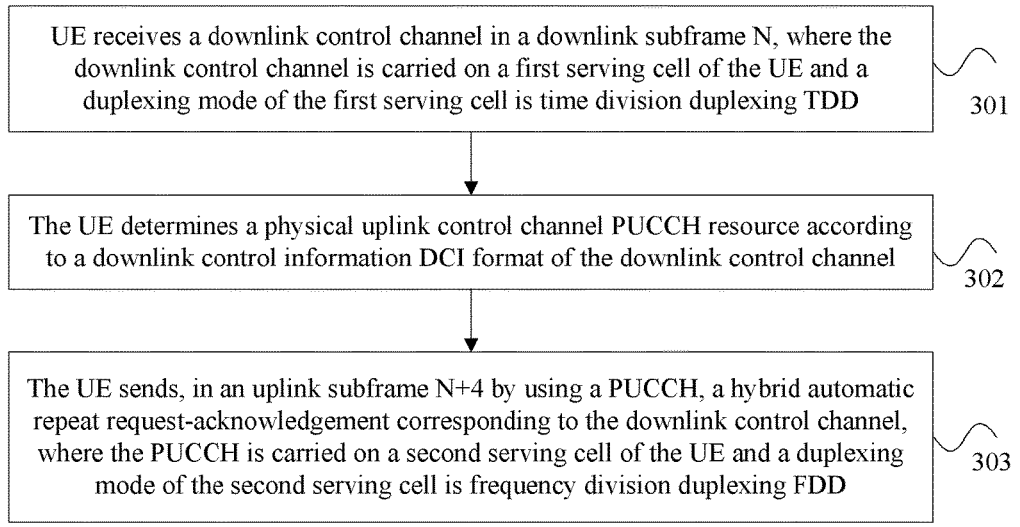
FIG. 4 is a flowchart of Embodiment 3 of an uplink control information transmission method according to the present invention.

FIG. 4 is a flowchart of Embodiment 3 of an uplink control information transmission method according to the present invention. As shown in FIG. 3, a difference between this embodiment and the embodiment shown in FIG. 2 lies in that, a PUCCH may be transmitted only on a secondary serving cell of UE, and a duplexing mode of the secondary serving cell is FDD. The following describes in detail a solution of this embodiment. The method in this embodiment may include:

Step 301: UE receives a downlink control channel in a downlink subframe N, where the downlink control channel is carried on a first serving cell of the UE and a duplexing mode of the first serving cell is time division duplexing TDD.

In this embodiment, the downlink control channel may be a physical downlink control channel PDCCH or an enhanced physical downlink control channel EPDCCH, where the downlink control channel may be used to indicate physical downlink shared channel PDSCH transmission carried on the first serving cell, or may be used to indicate downlink semi-persistent scheduling SPS releasing.

The step may further include: receiving, by the UE in the downlink subframe N, a PDSCH carried on a second serving cell of the UE, where a duplexing mode of the second serving cell is frequency division duplexing FDD.

Step 302: The UE determines a physical uplink control channel PUCCH resource according to a downlink control information DCI format of the downlink control channel.

In this step, the UE may determine the physical uplink control channel PUCCH resource according to the downlink control information DCI format of the downlink control channel in the following two manners:

Manner 1: The UE determines the physical uplink control channel PUCCH resource according to a downlink allocation indication DAI in the downlink control information DCI format of the downlink control channel.

In manner 1, the UE determines the physical uplink control channel PUCCH resource according to the downlink allocation indication DAI in the downlink control information DCI format of the downlink control channel, that is, determines, according to the downlink allocation indication DAI in the downlink control information DCI format of the downlink control channel, one PUCCH resource from four PUCCH resources configured by higher layer signaling, where physical resource blocks PRBs corresponding to the four PUCCH resources configured by the higher layer signaling are located on the second serving cell of the UE.

In this manner, when an HARQ-ACK corresponding to the first serving cell whose duplexing mode is TDD is transmitted on the second serving cell whose duplexing mode is FDD, the HARQ-ACK timing of the TDD may use the HARQ-ACK timing of the FDD; therefore, the DAI field in the DCI format may be reused to indicate the PUCCH resource. On one hand, a field in an existing DCI format may be better used, which improves resource utilization; on the other hand, the downlink control channel is carried on the first serving cell, and the corresponding PUCCH is carried on the second serving cell, and therefore, the UE cannot calculate the PUCCH resource implicitly according to a resource of the downlink control channel. In this embodiment, the PUCCH resource is indicated by using the DAI in the DCI format, so that the UE can feed back an HARQ-ACK, and PUCCH resource utilization can be improved by means of reusing of another user. In addition, indication is performed by using DAI, which can release TPC that is originally used to indicate the PUCCH resource, so that the TPC can be obtained in any case, thereby improving the power control efficiency of the PUCCH.

Manner 2: The UE determines the physical uplink control channel PUCCH resource according to a transmit power control TPC command in the downlink control information DCI format of the downlink control channel.

In manner 2, the UE indicates, by using a TPC command in a DCI format corresponding to the first serving cell (a primary serving cell), the PUCCH resource carried on the second serving cell (a secondary serving cell). In this case, a TPC command in a DCI format corresponding to the second serving cell (the secondary serving cell) is used to indicate a transmit power control command of the PUCCH resource.

When the user equipment receives, in step 301, a PDSCH carried on the second serving cell of the UE, the step may further include: determining, by the UE, a transmit power of the PUCCH according to a TPC command field in a DCI format of a downlink control channel corresponding to the PDSCH carried on the second serving cell.

Step 303: The UE sends, in an uplink subframe N+4 by using a PUCCH, a hybrid automatic repeat request-acknowledgement corresponding to the downlink control channel, where the PUCCH is carried on a second serving cell of the UE and a duplexing mode of the second serving cell is frequency division duplexing FDD.

The UE feeds back, on the second serving cell in the uplink subframe N+4 by using the PUCCH resource, the hybrid automatic repeat request-acknowledgement corresponding to the downlink control channel, where the downlink control channel may be used to indicate physical downlink shared channel PDSCH transmission carried on the first serving cell, or may be used to indicate downlink semi-persistent scheduling SPS releasing. When the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel, and when the downlink control channel is used to indicate the downlink semi-persistent scheduling SPS releasing, the hybrid automatic repeat request-acknowledgement corresponding to the downlink control channel is specifically the hybrid automatic repeat request-acknowledgement corresponding to the downlink control channel indicating the downlink semi-persistent scheduling SPS releasing.

In this step, when the user equipment receives, in step 301, the PDSCH carried on the second serving cell, the step may further include: sending, by the UE on the PUCCH in the uplink subframe N+4, the hybrid automatic repeat request-acknowledgement of the PDSCH carried on the second serving cell, where the PUCCH is carried on the second serving cell of the UE and a duplexing mode of the second serving cell is frequency division duplexing FDD. That is, in this case, the user equipment feeds back, on the PUCCH carried on the second serving cell, an HARQ-ACK corresponding to the downlink control channel carried on the first serving cell and an HARQ-ACK of the PDSCH carried on the second serving cell.

In this embodiment, the first serving cell is a primary serving cell of the UE and the second serving cell is a secondary serving cell of the UE. The second serving cell is an FDD secondary serving cell, having a smallest cell index, of the UE, or the second serving cell is a secondary serving cell, used to transmit a PUCCH, indicated by higher layer signaling, that is, the higher layer signaling may be used to indicate which secondary serving cell of the secondary serving cell of the user equipment is the second serving cell.

In this embodiment, when the primary serving cell (that is, the first serving cell) of the UE is TDD, the PUCCH is sent on the secondary serving cell (that is, the second serving cell) whose duplexing mode is FDD, so that the HARQ- ACK can be fed back on all FDD serving cells and TDD serving cells of the UE according to existing HARQ-ACK timing of the FDD serving cell. On one hand, all downlink subframes on the FDD carrier have corresponding uplink subframes used to feed back the HARQ-ACK, which improves resource utilization, and HARQ-ACK timing of the FDD carrier is not changed; on the other hand, HARQ-ACK bundling on the TDD serving cell is reduced, and an RTT delay of the TDD serving cell is reduced.

In an existing aggregation mechanism, after a secondary serving cell is configured for the UE, the secondary serving cell may be activated or deactivated; however, after a primary serving cell is configured for the UE, the primary serving cell cannot be deactivated. If a secondary serving cell is deactivated, a signal cannot be sent in an uplink of the secondary serving cell. In this embodiment of the present invention, because the second serving cell carrying the PUCCH is a secondary serving cell, if the secondary serving cell transmitting the PUCCH is deactivated, the PUCCH cannot be transmitted on the secondary serving cell. In this case, scheduling of a PDSCH on a primary serving cell of the UE may be affected. To resolve this problem, the following methods may be used.

Method 1: The second serving cell (the secondary serving cell) used to transmit the PUCCH cannot be deactivated.

In this method, once a serving cell is configured for the UE, and it is determined that a secondary serving cell is used to transmit the PUCCH, the secondary serving cell cannot be deactivated.

Method 2: If the user equipment receives deactivation signaling in the downlink subframe N, the UE stops sending the PUCCH on the second serving cell after a subframe N+K, where K is greater than or equal to 8.

Method 2 may also be: the user equipment receives the deactivation signaling in the downlink subframe N, and then, the UE transmits the PUCCH on a third serving cell after a subframe N+K, where the third serving cell is a secondary serving cell of the UE, a duplexing mode of the third serving cell is FDD, and the third serving cell is an activated serving cell, where K is greater than or equal to 8.

In method 2, the UE determines, after the subframe N+K according to the deactivation signaling received in the subframe N, which secondary serving cells in all secondary serving cells corresponding to the UE is currently in an activated state and determines, from the serving cells in an activated state, a secondary serving cell carrying the PUCCH, thereby avoiding a problem that a PDSCH cannot be scheduled on a primary serving cell before a new secondary serving cell carrying the PUCCH is determined, and ensuring transmission on the primary serving cell.

Method 3: If the user equipment receives only a PDSCH carried on the primary serving cell, the UE sends the PUCCH on the primary serving cell; if the user equipment receives the PDSCH on the secondary serving cell, the UE sends the PUCCH on the secondary serving cell.

The secondary serving cell is an FDD serving cell, the secondary serving cell is an FDD secondary serving cell having a smallest cell index, or the secondary serving cell is a secondary serving cell, used to transmit the PUCCH, indicated by higher layer signaling.

In method 3, if the secondary serving cell is deactivated, the base station may schedule a PDSCH only on a primary serving cell. In this case, the UE feeds back an HARQ-ACK of the primary serving cell on the primary serving cell by using the PUCCH, thereby avoiding an impact brought about by deactivation of a carrier on the secondary serving cell.

In method 3, step 303 may further include the step in method 3.

It should be noted that the manners described above are also applicable to another embodiment, especially an embodiment in which a PUCCH needs to be transmitted on a secondary serving cell, for example, method embodiment 1.

In this embodiment, UE receives, in a downlink subframe N, a downlink control channel sent by a base station, where the downlink channel is carried on a first serving cell of the UE, and sends a hybrid automatic repeat request-acknowledgement message corresponding to the downlink control channel to the base station in an uplink subframe N+4 by using a PUCCH carried on a second serving cell, where a duplexing mode of the first serving cell is time division duplexing TDD and a duplexing mode of the second serving cell is frequency division duplexing FDD. By means of the foregoing method, a problem of how to transmit an HARQ-ACK during aggregation of carriers of different duplexing modes is resolved. A PUCCH is fed back on a frequency division duplexing FDD carrier, so that all downlink subframes on the FDD serving cell of the user equipment have corresponding uplink subframes used to feed back the HARQ-ACK, which improves resource utilization, and HARQ-ACK timing of the FDD serving cell is not changed.

Figure 5:
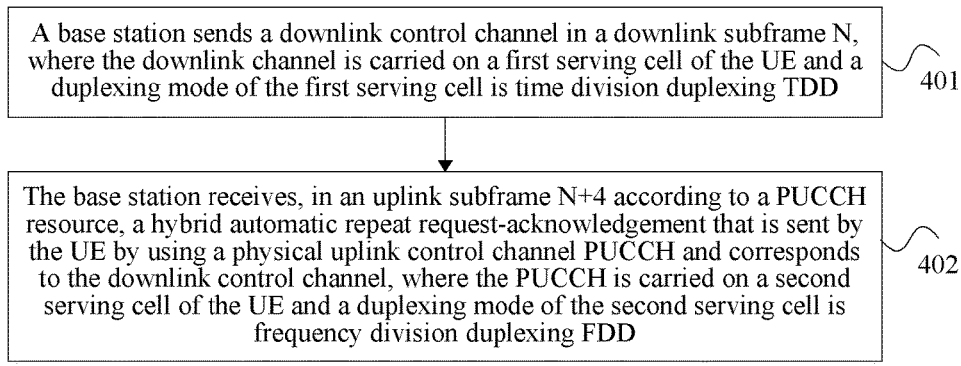
FIG. 5 is a flowchart of Embodiment 4 of an uplink control information transmission method according to the present invention.

FIG. 5 is a flowchart of Embodiment 4 of an uplink control information transmission method according to the present invention. Embodiment 3 describes the uplink control information transmission method from the perspective of UE, and this embodiment describes the transmission method from the perspective of a base station. As shown in FIG. 5, the method provided in this embodiment includes the following steps:

Step 401: A base station sends a downlink control channel in a downlink subframe N, where the downlink control channel is carried on a first serving cell of the UE and a duplexing mode of the first serving cell is time division duplexing TDD.

The downlink control channel may be a physical downlink control channel PDCCH or an enhanced physical downlink control channel EPDCCH, where the downlink control channel may be used to indicate physical downlink shared channel PDSCH transmission carried on the first serving cell, or may be used to indicate downlink semi-persistent scheduling SPS releasing.

In this embodiment, a downlink allocation indication DAI or a transmit power control TPC command in a downlink control information DCI format of the downlink control channel may be used to indicate a physical uplink control channel PUCCH resource, or it may be that the base station indicates a physical uplink control channel PUCCH resource by using a predefined field in a downlink control information DCI format of the downlink control channel, where the predefined field may be a downlink allocation indication DAI or a transmit power control TPC command Correspondingly, this step may be as follows:

Manner 1: The base station sends the downlink control channel to the UE in the downlink subframe N, where a physical downlink shared channel PDSCH corresponding to the downlink control channel is carried on the first serving cell, or the downlink control channel is carried on the first serving cell and the downlink control channel is a downlink control channel indicating downlink semi-persistent scheduling SPS releasing, where the first serving cell is a serving cell of the UE, a duplexing mode of the first serving cell is time division duplexing TDD, and the downlink allocation indication DAI in the downlink control information DCI format of the downlink control channel indicates the physical uplink control channel PUCCH resource.

In this manner, when an HARQ-ACK corresponding to the first serving cell whose duplexing mode is TDD is transmitted on the second serving cell whose duplexing mode is FDD, the HARQ-ACK timing of the TDD may use the HARQ-ACK timing of the FDD; therefore, the DAI field in the DCI format may be reused to indicate the PUCCH resource. On one hand, a field in an existing DCI format may be better used, which improves resource utilization; on the other hand, the downlink control channel is carried on the first serving cell, and the corresponding PUCCH is carried on the second serving cell, and therefore, the UE cannot calculate the PUCCH resource implicitly according to a resource of the downlink control channel. In this embodiment, the PUCCH resource is indicated by using the DAI in the DCI format, so that the UE can feed back an HARQ-ACK, and PUCCH resource utilization can be improved by means of reusing of another user. In addition, indication is performed by using DAI, which can release TPC that is originally used to indicate the PUCCH resource, so that the TPC can be obtained in any case, thereby improving the power control efficiency of the PUCCH.

Manner 2: The base station sends the downlink control channel to the UE in the downlink subframe N, where a physical downlink shared channel PDSCH corresponding to the downlink control channel is carried on the first serving cell, or the downlink control channel is carried on the first serving cell and the downlink control channel is a downlink control channel indicating downlink semi-persistent scheduling SPS releasing, where the first serving cell is a serving cell of the UE, a duplexing mode of the first serving cell is time division duplexing TDD, and the transmit power control TPC command in the downlink control information DCI format of the downlink control channel indicates the physical uplink control channel PUCCH resource.

In manner 2, the base station indicates, by using a TPC command in a DCI format corresponding to the first serving cell (a primary serving cell), the PUCCH resource carried on the second serving cell (a secondary serving cell). In this case, a TPC command in a DCI format corresponding to the second serving cell (the secondary serving cell) may be used to indicate a transmit power control command of the PUCCH resource.

Step 401 may further include: sending, by the base station, a PDSCH to the user equipment on the second serving cell of the UE in the downlink subframe N, where a duplexing mode of the second serving cell is frequency division duplexing FDD. In this case, manner 2 of the step may further include: indicating, by the base station, a transmit power of the PUCCH by using a TPC command field in the DCI format of the downlink control channel corresponding to the PDSCH carried on the second serving cell.

Step 402: The base station receives, in an uplink subframe N+4 according to a PUCCH resource, a hybrid automatic repeat request-acknowledgement that is sent by the UE by using a PUCCH and corresponds to the downlink control channel, where the PUCCH is carried on a second serving cell of the UE and a duplexing mode of the second serving cell is frequency division duplexing FDD.

When the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the downlink semi-persistent scheduling SPS releasing, the hybrid automatic repeat request-acknowledgement corresponding to the downlink control channel is specifically a hybrid automatic repeat request-acknowledgement corresponding to the downlink control channel indicating the downlink semi-persistent scheduling SPS releasing.

When step 401 further includes: sending, by the base station, the PDSCH to the user equipment on the second serving cell of the UE in the downlink subframe N, where a duplexing mode of the second serving cell is frequency division duplexing FDD, step 402 may further include: receiving, by the base station in the uplink subframe N+4 according to the PUCCH resource, an HARQ-ACK, sent by the UE by using the PUCCH, of the PDSCH carried on the second serving cell.

In this embodiment, the first serving cell is a primary serving cell of the UE and the second serving cell is a secondary serving cell of the UE. The second serving cell is an FDD secondary serving cell, having a smallest cell index, of the UE, or the second serving cell is a secondary serving cell, used to transmit the PUCCH, indicated by the base station, for example, the base station may indicate, by using RRC signaling, the second serving cell on which the user transmits the PUCCH.

In this embodiment, when the primary serving cell (that is, the first serving cell) of the UE is TDD, the PUCCH is sent on the secondary serving cell (that is, the second serving cell) whose duplexing mode is FDD, so that the HARQ-ACK can be fed back on all FDD serving cells and TDD serving cells of the UE according to existing HARQ-ACK timing of the FDD serving cell. On one hand, all downlink subframes on the FDD carrier have corresponding uplink subframes used to feed back the HARQ-ACK, which improves resource utilization, and HARQ-ACK timing of the FDD carrier is not changed; on the other hand, HARQ-ACK bundling on the TDD serving cell is reduced, and an RTT delay of the TDD serving cell is reduced.

In this embodiment, a base station sends a downlink control channel to user equipment UE in a downlink subframe N, where the downlink control channel is carried on a first serving cell of the UE, a duplexing mode of the first serving cell is time division duplexing TDD, and a downlink allocation indication DAI or a transmit power control TPC command in a downlink control information DCI format of the downlink control channel is used to indicate a physical uplink control channel PUCCH resource; and the base station receives, in an uplink subframe N+4 according to the PUCCH resource, a hybrid automatic repeat request-acknowledgement that is sent by the UE by using a PUCCH and corresponds to the downlink control channel, where the PUCCH is carried on the second serving cell of the UE and a duplexing mode of the second serving cell is FDD. By means of the foregoing method, a problem of how to transmit an HARQ-ACK during aggregation of carriers of different duplexing modes is resolved. A PUCCH is fed back on a FDD carrier, so that all downlink subframes on the FDD carriers have corresponding uplink subframes used to feed back the HARQ-ACK, which improves resource utilization, and HARQ-ACK timing of the FDD carrier is not changed.

Figure 6:
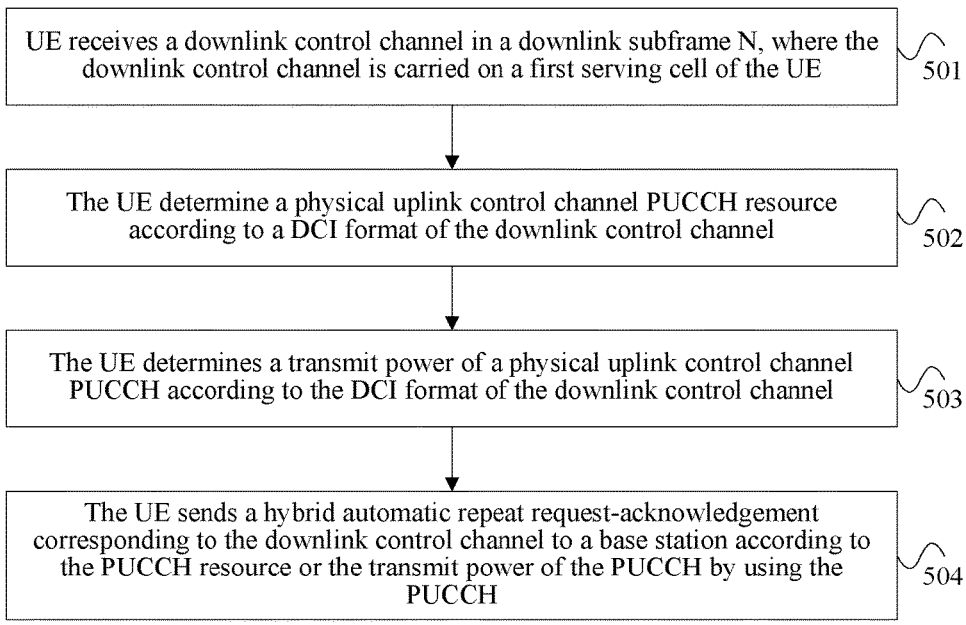
FIG. 6 is a flowchart of Embodiment 5 of an uplink control information transmission method according to the present invention.

FIG. 6 is a flowchart of Embodiment 5 of an uplink control information transmission method according to the present invention. In this embodiment, a PUCCH may be transmitted on a primary serving cell and a secondary serving cell of UE. When the primary serving cell corresponds to an uplink subframe, UE transmits the PUCCH on the primary serving cell; when the primary serving cell corresponds to a downlink subframe, the user equipment transmits the PUCCH on the secondary serving cell. The following describes in detail the solution of the present invention. As shown in FIG. 5, the method provided in this embodiment includes the following steps:

Step 501: UE receives a downlink control channel in a downlink subframe N, where the downlink control channel is carried on a first serving cell of the UE.

In this step, the UE receives the downlink control channel carried on the first serving cell, where the downlink control channel is a physical downlink control channel PDCCH or an enhanced physical downlink control channel EPDCCH, and the downlink control channel may be used to indicate physical downlink shared channel PDSCH transmission carried on the first serving cell, or may be used to indicate downlink semi-persistent scheduling SPS releasing. A downlink control information DCI format of the downlink control channel may be one or more of a DCI format 1, a DCI format 1A, a DCI format 1B, a DCI format 1D, a DCI format 2A, a DCI format 2B, a DCI format 2C, and a DCI format 2D. The first serving cell is a serving cell corresponding to the UE.

This step may further include: receiving, by the UE in the downlink subframe N, a PDSCH carried on the second serving cell of the UE.

Step 502: The UE determines a physical uplink control channel PUCCH resource according to a DCI format of the downlink control channel.

In this step, the UE determines the physical uplink control channel PUCCH resource according to the DCI format of the downlink control channel carried on the first serving cell in step 501.

Further, when a hybrid automatic repeat request-acknowledgement corresponding to the downlink control channel is carried on the second serving cell of the UE, the UE determines a physical uplink control channel PUCCH resource according to a transmit power control TPC command field in a downlink control information DCI format of the downlink control channel.

Step 503: The UE determines a transmit power of a physical uplink control channel PUCCH according to the DCI format of the downlink control channel.

In this step, the UE determines the transmit power of the physical uplink control channel PUCCH according to the DCI format of the downlink control channel carried on the first serving cell in step 1.

Further, when the hybrid automatic repeat request-acknowledgement corresponding to the downlink control channel is carried on the first serving cell, the UE determines the transmit power of the PUCCH according to the transmit power control TPC command field in the downlink control information DCI format of the downlink control channel.

Both the first serving cell and the second serving cell are serving cells corresponding to the UE and a duplexing mode of the first serving cell is different from a duplexing mode of the second serving cell. For one uplink subframe, either step 502 or step 503 exists.

In this embodiment, when the first serving cell is a primary serving cell of the UE and a duplexing mode of the first serving cell is time division duplexing TDD, a duplexing mode of the second serving cell is frequency division duplexing FDD and the second serving cell is an FDD secondary serving cell, having a smallest cell index, of the UE. Alternatively, when the first serving cell is a primary serving cell of the UE and a duplexing mode of the first serving cell is time division duplexing TDD, a duplexing mode of the second serving cell is frequency division duplexing FDD and the second serving cell is a secondary serving cell, used to transmit a PUCCH, indicated by higher layer signaling, that is, higher layer signaling may be used to indicate which secondary serving cell in the secondary serving cell of the user equipment is the second serving cell.

Step 504: The UE sends a hybrid automatic repeat request-acknowledgement corresponding to the downlink control channel to the base station by using the PUCCH according to the PUCCH resource or the transmit power of the PUCCH.

When the downlink control channel is used to indicate the physical downlink shared channel PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the downlink semi-persistent scheduling SPS releasing, the hybrid automatic repeat request-acknowledgement corresponding to the downlink control channel is specifically a hybrid automatic repeat request-acknowledgement corresponding to the downlink control channel indicating the downlink semi-persistent scheduling SPS releasing.

In the solution provided in this embodiment, user equipment UE receives a downlink control channel in a downlink subframe N, where the downlink control channel is carried on a first serving cell of the UE and the downlink control channel is a physical downlink control channel PDCCH or an enhanced physical downlink control channel EPDCCH. When a hybrid automatic repeat request-acknowledgement corresponding to the downlink control channel is carried on a second serving cell of the UE, the UE determines a physical uplink control channel PUCCH resource according to a transmit power control TPC command field in a downlink control information DCI format of the downlink control channel; when a hybrid automatic repeat request-acknowledgement corresponding to the downlink control channel is carried on the first serving cell, the UE determines a transmit power of a PUCCH according to the transmit power control TPC command field in the downlink control information DCI format of the downlink control channel, where a duplexing mode of the first serving cell is different from a duplexing mode of the second serving cell; and the UE sends, by using the PUCCH according to the PUCCH resource or the transmit power of the PUCCH, the hybrid automatic repeat request-acknowledgement corresponding to the downlink control channel. By means of the foregoing method, a problem of how to transmit an HARQ-ACK during aggregation of carriers of different duplexing modes is resolved, and a problem of how to transmit an HARQ-ACK in a scenario of aggregating FDD and TDD carriers is resolved at the same time, so that all downlink subframes on the FDD carrier have corresponding uplink subframes used to feed back an HARQ-ACK, which improves resource utilization, and HARQ-ACK timing of an FDD carrier is not changed.

Figure 7:
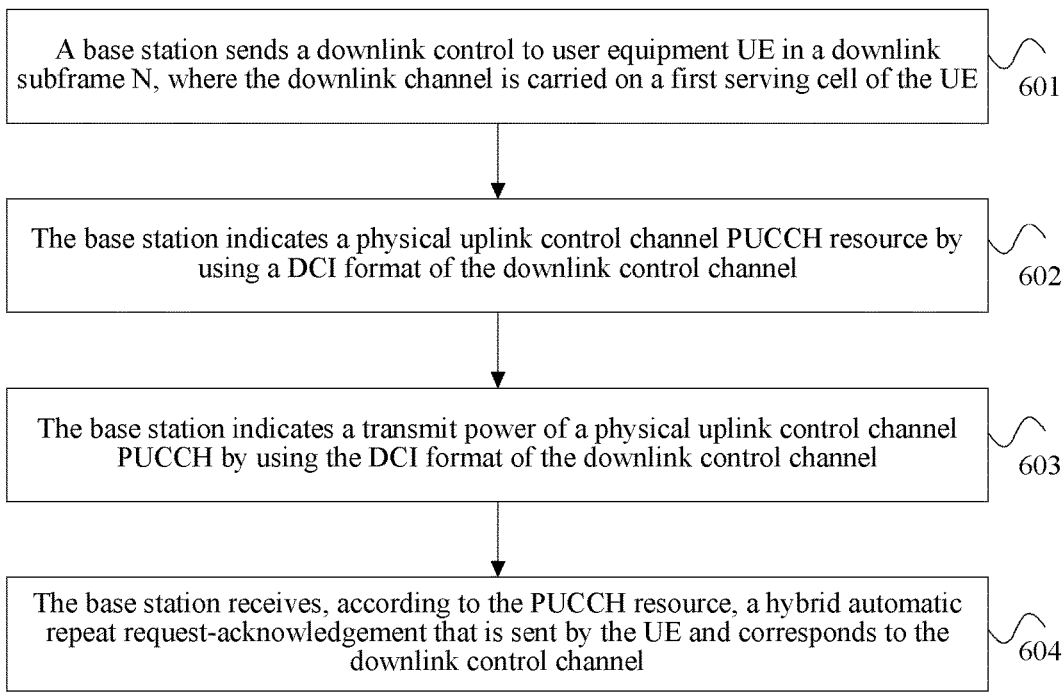
FIG. 7 is a flowchart of Embodiment 6 of an uplink control information transmission method according to the present invention.

FIG. 7 is a flowchart of Embodiment 6 of an uplink control information transmission method according to the present invention. Embodiment 5 describes the uplink control information transmission method from the perspective of UE, and this embodiment gives a description from the perspective of a base station. As shown in FIG. 7, the method provided in this embodiment includes the following steps:

Step 601: A base station sends a downlink control channel to user equipment UE in a downlink subframe N, where the downlink channel is carried on a first serving cell of the UE.

The base station sends the downlink control channel to the UE on the first serving cell, where the downlink control channel is a physical downlink control channel PDCCH or an enhanced physical downlink control channel EPDCCH, the downlink control channel is used to indicate physical downlink shared channel PDSCH transmission carried on the first serving cell, or is used to indicate downlink semi-persistent scheduling SPS releasing, and the first serving cell is a serving cell corresponding to the user equipment. A downlink control information DCI format of the downlink control channel may be one or more of a DCI format 1, a DCI format 1A, a DCI format 1B, a DCI format 1D, a DCI format 2A, a DCI format 2B, a DCI format 2C, and a DCI format 2D.

Step 602: The base station indicates a physical uplink control channel PUCCH resource by using a DCI format of the downlink control channel.

In step 602, the base station indicates the physical uplink control channel PUCCH resource by using the DCI format of the downlink control channel in step 601.

When a hybrid automatic repeat request-acknowledgement corresponding to the downlink control channel is carried on a second serving cell of the UE, the base station indicates the physical uplink control channel PUCCH resource by using a transmit power control TPC command field in the downlink control information DCI format of the downlink control channel.

Step 603: The base station indicates a transmit power of a physical uplink control channel PUCCH by using the DCI format of the downlink control channel.

In step 603, the base station indicates the transmit power of the physical uplink control channel PUCCH by using the DCI format of the downlink control channel in step 601.

When the hybrid automatic repeat request-acknowledgement corresponding to the downlink control channel is carried on the first serving cell, the base station indicates the transmit power of the PUCCH by using the transmit power control TPC command field in the downlink control information DCI format of the downlink control channel.

In this embodiment, both the first serving cell and the second serving cell are serving cells corresponding to the UE and a duplexing mode of the first serving cell is different from a duplexing mode of the second serving cell. When the first serving cell is a primary serving cell of the UE and a duplexing mode of the first serving cell is time division duplexing TDD, a duplexing mode of the second serving cell is frequency division duplexing FDD and the second serving cell is an FDD secondary serving cell, having a smallest cell index, of the UE. When the first serving cell is a primary serving cell of the UE and a duplexing mode of the first serving cell is time division duplexing TDD, a duplexing mode of the second serving cell is frequency division duplexing FDD and the second serving cell is a secondary serving cell, used to transmit the PUCCH, indicated by higher layer signaling in the secondary serving cells of the UE, or the second serving cell is a secondary serving cell, used to transmit the PUCCH, indicated by the base station.

Step 604: The base station receives, according to the PUCCH resource, a hybrid automatic repeat request-acknowledgement that is sent by the UE and corresponds to the downlink control channel.

When the downlink control channel is used to indicate the physical downlink shared channel PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the downlink semi-persistent scheduling SPS releasing, the hybrid automatic repeat request-acknowledgement corresponding to the downlink control channel is specifically a hybrid automatic repeat request-acknowledgement corresponding to the downlink control channel indicating the downlink semi-persistent scheduling SPS releasing.

By means of the method provided in this embodiment, a problem of how to transmit an HARQ-ACK during aggregation of carriers of different duplexing modes is resolved, and a problem of how to transmit an HARQ-ACK in a scenario of aggregating FDD and TDD carriers is resolved at the same time, so that all downlink subframes on the FDD carrier have corresponding uplink subframes used to feed back an HARQ-ACK, which improves resource utilization, and HARQ-ACK timing of an FDD carrier is not changed.

Figure 8:
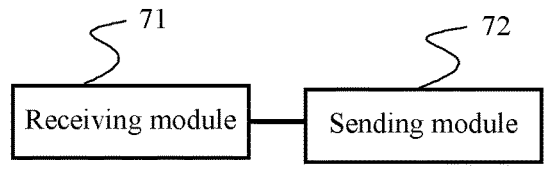
FIG. 8 is a schematic structural diagram of Embodiment 1 of user equipment according to the present invention.

FIG. 8 is a schematic structural diagram of Embodiment 1 of user equipment according to the present invention. As shown in FIG. 8, the user equipment provided in this embodiment includes a receiving module 71 and a sending module 72, where the receiving module 71 is configured to receive, in a downlink subframe N, a downlink control channel sent by a base station, where the downlink control channel is carried on a first serving cell of the UE; and the sending module 72 is configured to send a hybrid automatic repeat request-acknowledgement corresponding to the downlink control channel to the base station in an uplink subframe N+4 by using a physical uplink control channel PUCCH, where when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, where a duplexing mode of the first serving cell is different from a duplexing mode of the second serving cell, the sum of a quantity of uplink subframes included in the first uplink subframe set and a quantity of uplink subframes included in the second uplink subframe set is equal to a quantity of subframes in a radio frame, and an uplink subframe included in the first uplink subframe set and an uplink subframe included in the second uplink subframe set correspond to different subframes in the radio frame.

In this embodiment, when the downlink control channel is a physical downlink control channel PDCCH or an enhanced physical downlink control channel EPDCCH, the downlink control channel is used to indicate physical downlink shared channel PDSCH transmission carried on the first serving cell, or is used to indicate downlink semi-persistent scheduling SPS releasing. When the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

In this embodiment, both the first serving cell and the second serving cell serve the UE, but a duplexing mode of the first serving cell is different from a duplexing mode of the second serving cell. When the duplexing mode of the first serving cell is time division duplexing TDD and the duplexing mode of the second serving cell is frequency division duplexing FDD, the uplink subframe included in the second uplink subframe set corresponds to an uplink subframe, in a radio frame, of the first serving cell and the uplink subframe included in the first uplink subframe set corresponds to the other uplink subframe, except the uplink subframe included in the first uplink subframe set, in the radio frame. When the duplexing mode of the first serving cell is FDD and the duplexing mode of the second serving cell is TDD, the uplink subframe included in the first uplink subframe set corresponds to an uplink subframe, in a radio frame, of the first serving cell and the uplink subframe included in the second uplink subframe set corresponds to the other uplink subframe, except the uplink subframe included in the first uplink subframe set, in the radio frame.

Further, the user equipment provided in this embodiment may further include an acquiring module, configured to acquire a PUCCH resource and/or a PUCCH transmit power of the PUCCH. Specifically, when the uplink subframe N+4 belongs to the first uplink subframe set, the acquiring module is specifically configured to determine the PUCCH resource according to a transmit power control TPC command field in a downlink control information DCI format of the downlink control channel. When the uplink subframe N+4 belongs to the second uplink subframe set, the acquiring module is specifically configured to determine the PUCCH transmit power according to the transmit power control TPC command field in the downlink control information DCI format of the downlink control channel.

The user equipment provided in this embodiment may be configured to execute the technical solutions shown in method embodiment 1. Specific implementation manners and technical effects are similar to those of the method, and details are not described herein again.

Figure 9:
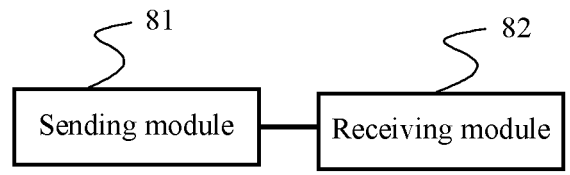
FIG. 9 is a schematic structural diagram of Embodiment 1 of a base station according to the present invention.

FIG. 9 is a schematic structural diagram of Embodiment 1 of a base station according to the present invention. As shown in FIG. 9, the base station provided in this embodiment includes a sending module 81 and a receiving module 82, where the sending module 81 is configured to send a downlink control channel to user equipment UE in a downlink subframe N, where the downlink control channel is carried on a first serving cell of the UE; and the receiving module 82 is configured to receive, in an uplink subframe N+4, a hybrid automatic repeat request-acknowledgement that is sent by UE by using a physical uplink control channel PUCCH and corresponds to the downlink control channel, where when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, where a duplexing mode of the first serving cell is different from a duplexing mode of the second serving cell, the sum of a quantity of uplink subframes included in the first uplink subframe set and a quantity of uplink subframes included in the second uplink subframe set is equal to a quantity of subframes in a radio frame, and an uplink subframe included in the first uplink subframe set and an uplink subframe included in the second uplink subframe set correspond to different subframes in the radio frame.

In this embodiment, the downlink control channel is a physical downlink control channel PDCCH or an enhanced physical downlink control channel EPDCCH, where the downlink control channel is used to indicate physical downlink shared channel PDSCH transmission carried on the first serving cell, or is used to indicate downlink semi-persistent scheduling SPS releasing. When the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

In this embodiment, a duplexing mode of the first serving cell is different from a duplexing mode of the second serving cell. When the duplexing mode of the first serving cell is time division duplexing TDD and the duplexing mode of the second serving cell is frequency division duplexing FDD, an uplink subframe included in the second uplink subframe set corresponds to an uplink subframe, in a radio frame, of the first serving cell and an uplink subframe included in the first uplink subframe set corresponds to the other uplink subframe, except the uplink subframe included in the second uplink subframe set, in the radio frame. When the duplexing mode of the first serving cell is FDD and the duplexing mode of the second serving cell is TDD, the uplink subframe included in the first uplink subframe set corresponds to an uplink subframe, in a radio frame, of the first serving cell and the uplink subframe included in the second uplink subframe set corresponds to the other uplink subframe, except the uplink subframe included in the first uplink subframe set, in the radio frame.

The base station provided in this embodiment may be configured to execute the technical solutions in method embodiment 2. Specific implementation manners and technical effects are similar to those of the method, and details are not described herein again.

Figure 10:
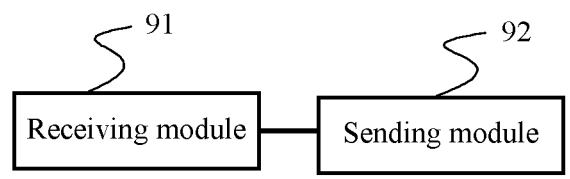
FIG. 10 is a schematic structural diagram of Embodiment 2 of user equipment according to the present invention.

FIG. 10 is a schematic structural diagram of Embodiment 2 of user equipment according to the present invention. As shown in FIG. 10, the user equipment provided in this embodiment includes a receiving module 91 and a sending module 92, where the receiving module 91 is configured to receive a downlink control channel in a downlink subframe N, where the downlink control channel is carried on a first serving cell of the UE and a duplexing mode of the first serving cell is time division duplexing TDD; and the sending module 92 is configured to send, in an uplink subframe N+4 by using a physical uplink control channel PUCCH, a hybrid automatic repeat request-acknowledgement corresponding to the downlink control channel, where the PUCCH is carried on a second serving cell of the UE and a duplexing mode of the second serving cell is frequency division duplexing FDD.

In this embodiment, the downlink control channel is a physical downlink control channel PDCCH or an enhanced physical downlink control channel EPDCCH, where the downlink control channel is used to indicate physical downlink shared channel PDSCH transmission carried on the first serving cell, or is used to indicate downlink semi-persistent scheduling SPS releasing. When the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

Further, the user equipment in this embodiment may further include: an acquiring module, configured to acquire a PUCCH resource of the PUCCH. The acquiring module is specifically configured to determine the PUCCH resource according to a downlink allocation indication DAI or a transmit power control TPC command in a downlink control information DCI format of the downlink control channel.

In this embodiment, the first serving cell may be a primary serving cell of the UE and the second serving cell is a secondary serving cell of the UE. The second serving cell may be specifically an FDD secondary serving cell, having a smallest cell index, of the UE, or the second serving cell is a secondary serving cell, used to transmit the PUCCH, indicated by higher layer signaling.

The user equipment provided in this embodiment may be configured to execute the technical solutions in method embodiment 3. Specific implementation manners and technical effects are similar to those of the method, and details are not described herein again.

Figure 11:
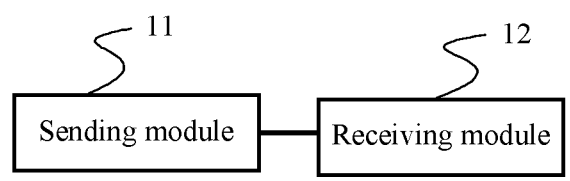
FIG. 11 is a schematic structural diagram of Embodiment 2 of a base station according to the present invention.

FIG. 11 is a schematic structural diagram of Embodiment 2 of a base station according to the present invention. As shown in FIG. 11, the base station provided in this embodiment includes a sending module 11 and a receiving module 12, where the sending module 11 is configured to send a downlink control channel to user equipment UE in a downlink subframe N, where the downlink control channel is carried on a first serving cell of the UE, a duplexing mode of the first serving cell is time division duplexing TDD, and a downlink allocation indication DAI or a transmit power control TPC command in a downlink control information DCI format of the downlink control channel is used to indicate a physical uplink control channel PUCCH resource; and the receiving module 12 is configured to receive, in an uplink subframe N+4 according to the PUCCH resource, a hybrid automatic repeat request-acknowledgement that is sent by the UE by using a PUCCH and corresponds to the downlink control channel, where the PUCCH is carried on a second serving cell of the UE and a duplexing mode of the second serving cell is frequency division duplexing FDD.

In this embodiment, the downlink control channel is a physical downlink control channel PDCCH or an enhanced physical downlink control channel EPDCCH, where the downlink control channel is used to indicate physical downlink shared channel PDSCH transmission carried on the first serving cell, or is used to indicate downlink semi-persistent scheduling SPS releasing. When the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

In this embodiment, the first serving cell may be a primary serving cell of the UE and the second serving cell is a secondary serving cell of the UE. Specifically, the second serving cell may be specifically an FDD secondary serving cell, having a smallest cell index, of the UE, or the second serving cell is a secondary serving cell, used to transmit the PUCCH, indicated by the base station by using higher layer signaling.

The base station provided in this embodiment may be configured to execute the technical solutions in method embodiment 4. Specific implementation manners and technical effects are similar to those of the method, and details are not described herein again.

Figure 12:
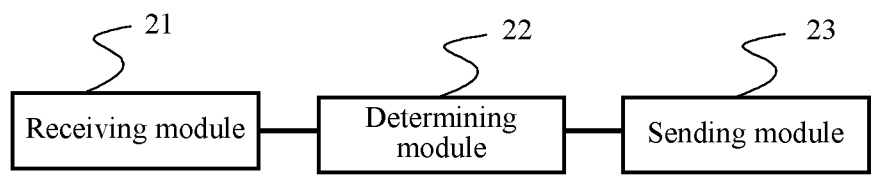
FIG. 12 is a schematic structural diagram of Embodiment 3 of user equipment according to the present invention.

FIG. 12 is a schematic structural diagram of Embodiment 3 of user equipment according to the present invention. As shown in FIG. 12, the user equipment in this embodiment includes a receiving module 21, a determining module 22, and a sending module 23, where the receiving module 21 is configured to receive a downlink control channel in a downlink subframe N, where the downlink control channel is carried on a first serving cell of the UE and the downlink control channel is a physical downlink control channel PDCCH or an enhanced physical downlink control channel EPDCCH;

the determining module 22 is configured to: when a hybrid automatic repeat request-acknowledgement corresponding to the downlink control channel is carried on a second serving cell of the UE, determine, by the UE, a physical uplink control channel PUCCH resource according to a transmit power control TPC command field in a downlink control information DCI format of the downlink control channel; and when the hybrid automatic repeat request-acknowledgement corresponding to the downlink control channel is carried on the first serving cell, determine, by the UE, a transmit power of a PUCCH according to the transmit power control TPC command field in the downlink control information DCI format of the downlink control channel, where a duplexing mode of the first serving cell is different from a duplexing mode of the second serving cell; and the sending module 23 is configured to send, by using the PUCCH according to the PUCCH resource or the transmit power of the PUCCH, the hybrid automatic repeat request-acknowledgement corresponding to the downlink control channel.

In this embodiment, the downlink control channel is used to indicate physical downlink shared channel PDSCH transmission carried on the first serving cell, or is used to indicate downlink semi-persistent scheduling SPS releasing. When the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

In this embodiment, the first serving cell may be a primary serving cell of the UE, the duplexing mode of the first serving cell is time division duplexing TDD, the duplexing mode of the second serving cell is frequency division duplexing FDD, and the second serving cell is an FDD secondary serving cell, having a smallest cell index, of the UE.

Alternatively, when the first serving cell is a primary serving cell of the UE and the duplexing mode of the first serving cell is time division duplexing TDD, the duplexing mode of the second serving cell is frequency division duplexing FDD and the second serving cell is a secondary serving cell, used to transmit the PUCCH, indicated by higher layer signaling.

The user equipment provided in this embodiment may be configured to execute the technical solutions in method embodiment 5. Specific implementation manners and technical effects are similar to those of the method, and details are not described herein again.

Figure 13:
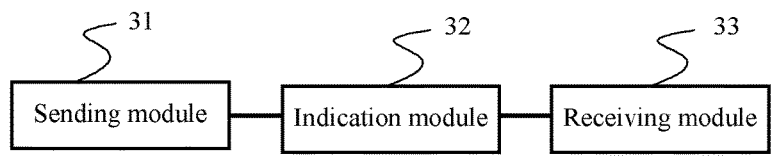
FIG. 13 is a schematic structural diagram of Embodiment 3 of a base station according to the present invention.

FIG. 13 is a schematic structural diagram of Embodiment 3 of a base station according to the present invention. As shown in FIG. 13, the base station provided in this embodiment includes a sending module 31, an indication module 32, and a receiving module 33, where the sending module 31 is configured to send a downlink control channel to user equipment UE in a downlink subframe N, where the downlink channel is carried on a first serving cell of the UE and the downlink control channel is a physical downlink control channel PDCCH or an enhanced physical downlink control channel EPDCCH;

the indication module 32 is configured to: when a hybrid automatic repeat request-acknowledgement corresponding to the downlink control channel is carried on a second serving cell of the UE, indicate a physical uplink control channel PUCCH resource by using a transmit power control TPC command field in a downlink control information DCI format of the downlink control channel; and when the hybrid automatic repeat request-acknowledgement corresponding to the downlink control channel is carried on the first serving cell, indicate a transmit power of a PUCCH by using the transmit power control TPC command field in the downlink control information DCI format of the downlink control channel, where a duplexing mode of the first serving cell is different from a duplexing mode of the second serving cell; and the receiving module 33 is configured to receive, according to the PUCCH resource, the hybrid automatic repeat request-acknowledgement that is sent by the UE and corresponds to the downlink control channel.

The downlink control channel is used to indicate physical downlink shared channel PDSCH transmission carried on the first serving cell, or is used to indicate downlink semi-persistent scheduling SPS releasing.

When the downlink control channel is used to indicate the physical downlink shared channel PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the downlink semi-persistent scheduling SPS releasing, the hybrid automatic repeat request-acknowledgement corresponding to the downlink control channel is specifically a hybrid automatic repeat request-acknowledgement corresponding to the downlink control channel indicating the downlink semi-persistent scheduling SPS releasing.

In this embodiment, the first serving cell may be a primary serving cell of the UE, the duplexing mode of the first serving cell is time division duplexing TDD, the duplexing mode of the second serving cell is frequency division duplexing FDD, and the second serving cell is an FDD secondary serving cell, having a smallest cell index, of the UE. Alternatively, when the first serving cell is a primary serving cell of the UE and the duplexing mode of the first serving cell is time division duplexing TDD, the duplexing mode of the second serving cell is frequency division duplexing FDD and the second serving cell is a secondary serving cell, used to transmit the PUCCH, indicated by higher layer signaling.

The base station provided in this embodiment may be configured to execute the technical solutions in method embodiment 6. Specific implementation manners and technical effects are similar to those of the method, and details are not described herein again.

Figure 14:
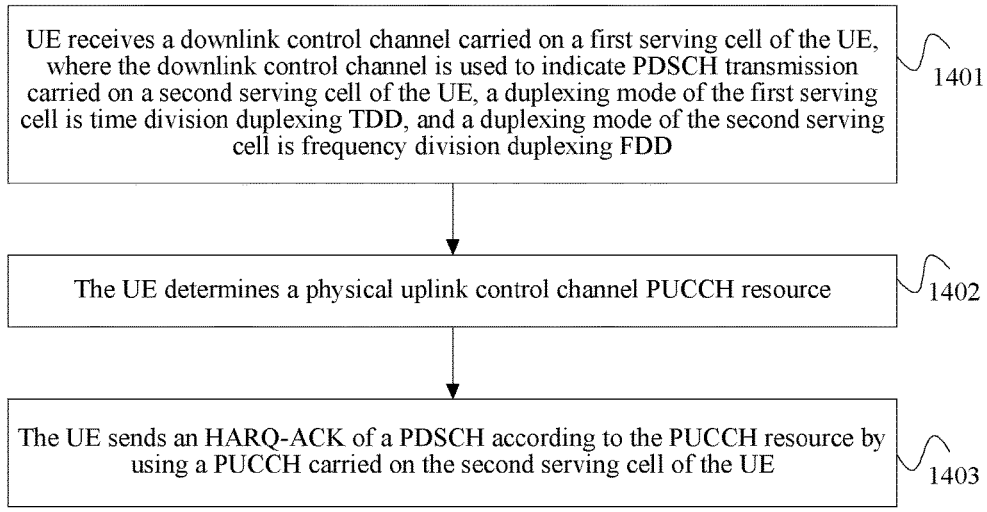
FIG. 14 is a flowchart of Embodiment 7 of an uplink control information transmission method according to the present invention.

FIG. 14 is a flowchart of Embodiment 7 of an uplink control information transmission method according to the present invention. As shown in FIG. 14, the method provided in this embodiment includes the following steps:

Step 1401: UE receives a downlink control channel carried on a first serving cell of the UE, where the downlink control channel is used to indicate PDSCH transmission carried on a second serving cell of the UE, a duplexing mode of the first serving cell is time division duplexing TDD, and a duplexing mode of the second serving cell is frequency division duplexing FDD.

During aggregation of carriers of different duplexing modes, if cross-carrier scheduling is configured for the user equipment, it may occur that a downlink control channel corresponding to a PDSCH carried on an FDD serving cell is carried on a TDD serving cell.

In this step, when HARQ-ACK timing of the second serving cell is performed according to HARQ-ACK timing of the first serving cell, HARQ-ACKs corresponding to multiple downlink subframes on the second serving cell are fed back in one uplink subframe corresponding to the first serving cell. In this case, the downlink control channel received in step 1401 may include downlink control channels received in multiple downlink subframes, where a DAI in a DCI format of the first received downlink control channel is equal to 1, a DAI in a DCI format of the second received downlink control channel is equal to 2, and so on.

In this step, when the HARQ-ACK timing of the second serving cell is performed according to the HARQ-ACK timing of the second serving cell, that is, according to HARQ-ACK timing of the FDD serving cell, the downlink control channel received in step 1401 corresponds to only a downlink control channel received in one downlink subframe.

The downlink control channel in this step may be a PDCCH or an EPDCCH.

Step 1402: The UE determines a physical uplink control channel PUCCH resource.

In this manner, the UE may determine the PUCCH resource in the following several manners:

Manner 1: The UE determines the PUCCH resource according to a TPC command field in a DCI format of the downlink control channel carried on the first serving cell.

Specifically, the UE determines the PUCCH resource according to the TPC command field in the DCI format, whose DAI is equal to 1, of the downlink control channel carried on the first serving cell, where a PRB corresponding to the PUCCH resource is located on the second serving cell of the UE.

In manner 1, step 1402 may further include: determining, by the UE, a transmit power of a PUCCH. Specifically, the UE determines the transmit power of the PUCCH according to the TPC command field in the DCI format, whose DAI is greater than 1, of the downlink control channel carried on the first serving cell.

Manner 1 is applicable to a case in which the HARQ-ACK timing of the second serving cell is performed according to the HARQ-ACK timing of the first serving cell.

In manner 1, the PUCCH resource is indicated by using the TPC in the DCI format, the PUCCH resource may be indicated by means of dynamic displaying, and users may reuse the PUCCH resource, thereby improving utilization of the PUCCH resource.

Manner 2: The UE determines the PUCCH resource according to higher layer signaling.

In manner 2, the UE determines the PUCCH resource according to the higher layer signaling, that is, the PUCCH resource is indicated by using the higher layer signaling, where the higher layer signaling may be radio resource control (Radio Resource Control, RRC for short) signaling. In this case, the PUCCH resource is semi-statically reserved.

In manner 2, step 1402 may further include: determining, by the UE, a transmit power of a PUCCH. Specifically, the UE determines the transmit power of the PUCCH according to the TPC command field in the DCI format of the downlink control channel carried on the first serving cell.

In manner 2, the PUCCH resource is semi-statically reserved, so that manner 2 is applicable to any scenario and the TPC of the PUCCH resource can always be obtained, thereby improving the power control efficiency.

Manner 3: The UE determines the PUCCH resource according to a predefined field in the DCI format of the downlink control channel carried on the first serving cell.

In manner 3, the predefined field may be a new field added to the DCI format, where the field corresponds to 2-bit information.

In manner 3, step 1402 may further include: determining, by the UE, a transmit power of a PUCCH. Specifically, the UE determines the transmit power of the PUCCH according to the TPC command field in the DCI format of the downlink control channel carried on the first serving cell.

In manner 3, the PUCCH resource is indicated by using the TPC in the DCI format, the PUCCH resource may be indicated by means of dynamic displaying, and users may reuse the PUCCH resource, thereby improving utilization of the PUCCH resource. Meanwhile, manner 3 is applicable to any scenario.

Manner 4: The UE determines the PUCCH resource according to an HARQ-ACK resource offset (resource offset) field in the DCI format of the downlink control channel carried on the first serving cell.

Manner 4 is applicable to a case in which the downlink control channel is an EPDCCH. In manner 4, step 1402 may further include: determining, by the UE, a transmit power of a PUCCH. Specifically, the UE determines the transmit power of the PUCCH according to the TPC command field in the DCI format of the downlink control channel carried on the first serving cell.

In manner 4, the PUCCH resource is indicated by using the TPC in the DCI format, the PUCCH resource may be indicated by means of dynamic displaying, and users may reuse the PUCCH resource, thereby improving utilization of the PUCCH resource.

Step 1403: The UE sends an HARQ-ACK of a PDSCH according to the PUCCH resource by using a PUCCH carried on the second serving cell of the UE.

In this step, the UE sends the HARQ-ACK of the PDSCH according to the PUCCH resource by using the PUCCH carried on the second serving cell of the UE, that is, sends the HARQ-ACK of the PDSCH in step 1401 according to the PUCCH resource by using the PUCCH carried on the second serving cell of the UE.

This step may further be: sending, by the UE, the HARQ-ACK of the PDSCH according to the PUCCH resource and the PUCCH transmit power by using the PUCCH carried on the second serving cell of the UE.

This embodiment of the present invention resolves a problem of how to transmit an HARQ-ACK during aggregation of carriers of different duplexing modes, and meanwhile resolves a problem of how to indicate a PUCCH resource in a case of cross-carrier scheduling. For example, during aggregation of carriers of different duplexing modes, if cross-carrier scheduling is configured, and when a serving cell carrying a downlink control channel corresponding to a PDSCH is different from a serving cell carrying an HARQ-ACK corresponding to the PDSCH, the UE cannot calculate the PUCCH resource implicitly according to a resource of the downlink control channel; therefore, how to indicate the PUCCH resource needs to be resolved.

Figure 15:
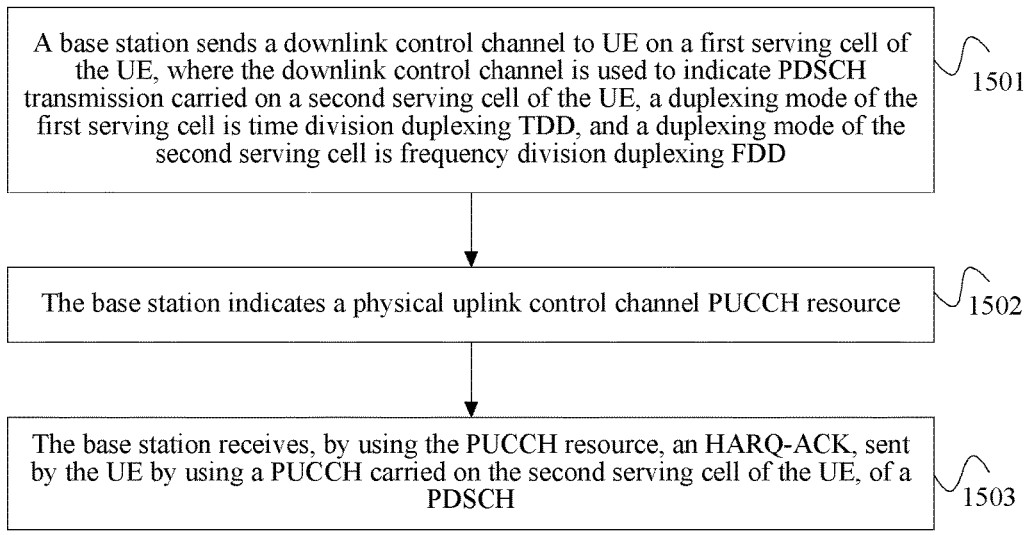
FIG. 15 is a flowchart of Embodiment 8 of an uplink control information transmission method according to the present invention.

FIG. 15 is a flowchart of Embodiment 8 of an uplink control information transmission method according to the present invention. This embodiment describes, from the perspective of a base station, the method in Embodiment 7. As shown in FIG. 15, the method provided in this embodiment includes the following steps:

Step 1501: A base station sends a downlink control channel to UE on a first serving cell of the UE, where the downlink control channel is used to indicate PDSCH transmission carried on a second serving cell of the UE, a duplexing mode of the first serving cell is time division duplexing TDD, and a duplexing mode of the second serving cell is frequency division duplexing FDD.

In this step, when HARQ-ACK timing of the second serving cell is performed according to HARQ-ACK timing of the first serving cell, HARQ-ACKs corresponding to multiple downlink subframes on the second serving cell are fed back in one uplink subframe corresponding to the first serving cell. In this case, in step 1501, the base station sends the downlink control channel to the UE on the first serving cell of the UE in multiple downlink subframes, where a DAI in a DCI format of the first sent downlink control channel is equal to 1, a DAI in a DCI format of the second sent downlink control channel is equal to 2, and so on.

In this step, when the HARQ-ACK timing of the second serving cell is performed according to the HARQ-ACK timing of the second serving cell, that is, according to HARQ-ACK timing of the FDD serving cell, the downlink control channel sent by the base station to the UE on the first serving cell of the UE in step 1501 corresponds to only a downlink control channel received in one downlink subframe.

For other descriptions of this step, refer to descriptions of step 1401 in Embodiment 7, and details are not described herein again.

Step 1502: The base station indicates a physical uplink control channel PUCCH resource.

In this manner, the base station may indicate the PUCCH resource in the following several manners:

Manner 1: The base station indicates the PUCCH resource by using a TPC command field in a DCI format of the downlink control channel carried on the first serving cell.

Specifically, the base station indicates the PUCCH resource by using the TPC command field in the DCI format, whose DAI is equal to 1, of the downlink control channel carried on the first serving cell, where a PRB corresponding to the PUCCH resource is located on the second serving cell of the UE.

In manner 1, step 1502 may further include: indicating, by the base station, a transmit power of a PUCCH. Specifically, the base station indicates the transmit power of the PUCCH by using the TPC command field in the DCI format, whose DAI is greater than 1, of the downlink control channel carried on the first serving cell.

Manner 1 is applicable to a case in which the HARQ-ACK timing of the second serving cell is performed according to the HARQ-ACK timing of the first serving cell.

In manner 1, the PUCCH resource is indicated by using the TPC in the DCI format, the PUCCH resource may be indicated by means of dynamic displaying, and users may reuse the PUCCH resource, thereby improving utilization of the PUCCH resource.

Manner 2: The base station indicates the PUCCH resource by using higher layer signaling.

In manner 2, the base station indicates the PUCCH resource by using the higher layer signaling, where the higher layers signaling may be radio resource control RRC signaling. In this case, the PUCCH resource is semi-statically reserved.

In manner 2, step 1502 may further include: indicating, by the base station, a transmit power of a PUCCH. Specifically, the base station indicates the transmit power of the PUCCH by using the TPC command field in the DCI format of the downlink control channel carried on the first serving cell.

In manner 2, the PUCCH resource is semi-statically reserved, so that manner 2 is applicable to any scenario and the TPC of the PUCCH resource can always be obtained, thereby improving the power control efficiency.

Manner 3: The base station indicates the PUCCH resource by using a predefined field in the DCI format of the downlink control channel carried on the first serving cell.

In manner 3, the predefined field may be a new field added to the DCI format, where the field corresponds to 2-bit information.

In manner 3, step 1502 may further include: indicating, by the base station, a transmit power of a PUCCH. Specifically, the base station indicates the transmit power of the PUCCH by using the TPC command field in the DCI format of the downlink control channel carried on the first serving cell.

In manner 3, the PUCCH resource is indicated by using the TPC in the DCI format, the PUCCH resource may be indicated by means of dynamic displaying, and users may reuse the PUCCH resource, thereby improving utilization of the PUCCH resource. Meanwhile, manner 3 is applicable to any scenario.

Manner 4: The base station indicates the PUCCH resource by using an HARQ-ACK resource offset (resource offset) field in the DCI format of the downlink control channel carried on the first serving cell.

Manner 4 is applicable to a case in which the downlink control channel is an EPDCCH. In manner 4, step 1502 may further include: indicating, by the base station, a transmit power of a PUCCH. Specifically, the base station indicates the transmit power of the PUCCH by using the TPC command field in the DCI format of the downlink control channel carried on the first serving cell.

In manner 4, the PUCCH resource is indicated by using the TPC in the DCI format, the PUCCH resource may be indicated by means of dynamic displaying, and users may reuse the PUCCH resource, thereby improving utilization of the PUCCH resource.

Step 1503: The base station receives, according to the PUCCH resource, an HARQ-ACK, sent by the UE by using a PUCCH carried on the second serving cell of the UE, of a PDSCH.

In this step, the base station receives, according to the PUCCH resource, the HARQ-ACK, sent by the UE by using the PUCCH carried on the second serving cell of the UE, of the PDSCH, that is, receives the HARQ-ACK, sent by the UE by using the PUCCH carried on the second serving cell of the UE, of the PDSCH in step 1501.

This embodiment of the present invention resolves a problem of how to transmit an HARQ-ACK during aggregation of carriers of different duplexing modes, and meanwhile resolves a problem of how to indicate a PUCCH resource in a case of cross-carrier scheduling. For example, during aggregation of carriers of different duplexing modes, if cross-carrier scheduling is configured, and when a serving cell carrying a downlink control channel corresponding to a PDSCH is different from a serving cell carrying an HARQ-ACK corresponding to the PDSCH, the UE cannot calculate the PUCCH resource implicitly according to a resource of the downlink control channel; therefore, how to indicate the PUCCH resource needs to be resolved.

Figure 16:
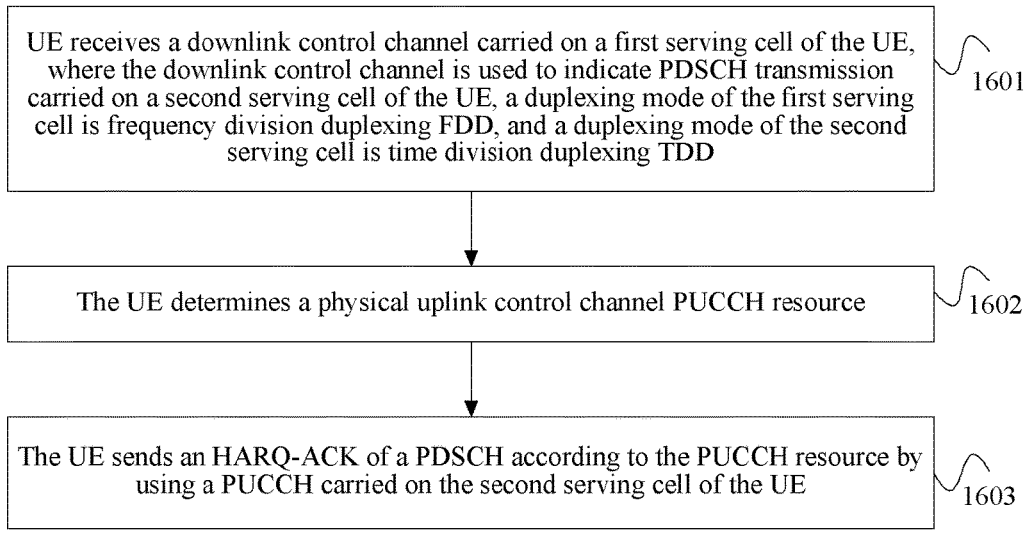
FIG. 16 is a flowchart of Embodiment 9 of an uplink control information transmission method according to the present invention.

FIG. 16 is a flowchart of Embodiment 9 of an uplink control information transmission method according to the present invention, which is applicable to a scenario in which an FDD carrier performs cross-carrier scheduling on a TDD carrier and an HARQ-ACK of the TDD carrier is carried on the TDD carrier. As shown in FIG. 16, the method provided in this embodiment includes the following steps:

Step 1601: UE receives a downlink control channel carried on a first serving cell of the UE, where the downlink control channel is used to indicate PDSCH transmission carried on a second serving cell of the UE, a duplexing mode of the first serving cell is frequency division duplexing FDD, and a duplexing mode of the second serving cell is time division duplexing TDD.

In this step, HARQ-ACK timing of the second serving cell is performed according to the HARQ-ACK timing of the second serving cell, or according to HARQ-ACK timing of a serving cell carrying a PUCCH. No matter whether the HARQ-ACK timing of the second serving cell uses the HARQ-ACK timing of the second serving cell or the HARQ-ACK timing of the serving cell carrying the PUCCH, the HARQ-ACK timing is TDD timing; therefore, HARQ-ACKs corresponding to multiple downlink subframes on the second serving cell are fed back in one uplink subframe. In this case, the downlink control channel received in step 1601 may include downlink control channels received in multiple downlink subframes, where a DAI in a DCI format of the first received downlink control channel is equal to 1, a DAI in a DCI format of the second received downlink control channel is equal to 2, and so on.

Other descriptions are the same as those of step 1401, and details are not described herein again.

Step 1602: The UE determines a physical uplink control channel PUCCH resource.

This step is the same as step 1402 in Embodiment 7, and details are not described herein again. However, in this embodiment, among the four manners, manner 1 is an exemplary manner.

Step 1603: The UE sends an HARQ-ACK of a PDSCH according to the PUCCH resource by using a PUCCH carried on the second serving cell of the UE.

This step is the same as step 1403 in Embodiment 7, and details are not described herein again.

This embodiment of the present invention resolves a problem of how to transmit an HARQ-ACK during aggregation of carriers of different duplexing modes, and meanwhile resolves a problem of how to indicate a PUCCH resource in a case of cross-carrier scheduling. For example, during aggregation of carriers of different duplexing modes, if cross-carrier scheduling is configured, and when a serving cell carrying a downlink control channel corresponding to a PDSCH is different from a serving cell carrying an HARQ-ACK corresponding to the PDSCH, the UE cannot calculate the PUCCH resource implicitly according to a resource of the downlink control channel; therefore, how to indicate the PUCCH resource needs to be resolved.

Figure 17:
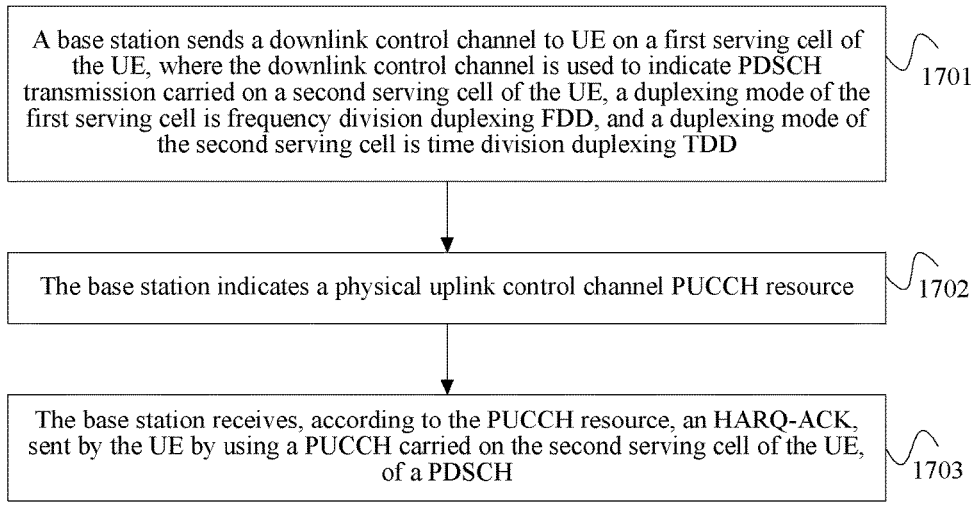
FIG. 17 is a flowchart of Embodiment 10 of an uplink control information transmission method according to the present invention.

FIG. 17 is a flowchart of Embodiment 10 of an uplink control information transmission method according to the present invention. This embodiment describes, from the perspective of a base station, the method in Embodiment 9. As shown in FIG. 17, the method provided in this embodiment includes the following steps:

Step 1701: A base station sends a downlink control channel to UE on a first serving cell of the UE, where the downlink control channel is used to indicate PDSCH transmission carried on a second serving cell of the UE, a duplexing mode of the first serving cell is frequency division duplexing FDD, and a duplexing mode of the second serving cell is time division duplexing TDD.

In this step, HARQ-ACK timing of the second serving cell is performed according to the HARQ-ACK timing of the second serving cell, or according to HARQ-ACK timing of a serving cell carrying a PUCCH. No matter whether the HARQ-ACK timing of the second serving cell uses the HARQ-ACK timing of the second serving cell or the HARQ-ACK timing of the serving cell carrying the PUCCH, the HARQ-ACK timing is TDD timing; therefore, HARQ-ACKs corresponding to multiple downlink subframes on the second serving cell are fed back in one uplink subframe. In this case, the base station sends the downlink control channel to the UE on the first serving cell of the UE in multiple downlink subframes in step 1701, where a DAI in a DCI format of the first received downlink control channel is equal to 1, a DAI in a DCI format of the second received downlink control channel is equal to 1, and so on.

Step 1702: The base station indicates a physical uplink control channel PUCCH resource.

This step is the same as step 1502 in Embodiment 8, and details are not described herein again. In this embodiment, among the four manners, manner 1 is an exemplary manner.

Step 1703: The base station receives, according to the PUCCH resource, an HARQ-ACK, sent by the UE by using a PUCCH carried on the second serving cell of the UE, of a PDSCH.

This step is the same as step 1503 in Embodiment 8, and details are not described herein again.

This embodiment of the present invention resolves a problem of how to transmit an HARQ-ACK during aggregation of carriers of different duplexing modes, and meanwhile resolves a problem of how to indicate a PUCCH resource in a case of cross-carrier scheduling. For example, during aggregation of carriers of different duplexing modes, if cross-carrier scheduling is configured, and when a serving cell carrying a downlink control channel corresponding to a PDSCH is different from a serving cell carrying an HARQ-ACK corresponding to the PDSCH, the UE cannot calculate the PUCCH resource implicitly according to a resource of the downlink control channel; therefore, how to indicate the PUCCH resource needs to be resolved.

Figure 18:
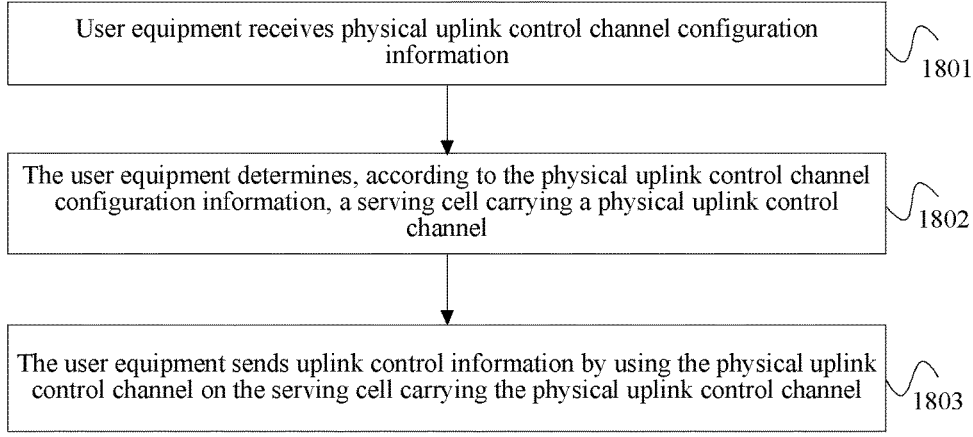
FIG. 18 is a flowchart of Embodiment 11 of an uplink control information transmission method according to the present invention.

FIG. 18 is a flowchart of Embodiment 11 of an uplink control information transmission method according to the present invention. As shown in FIG. 18, for uplink control information transmission in a scenario of aggregation of different duplexing modes and/or aggregation between base stations, the uplink control information transmission method may specifically include the following steps:

Step 1801: User equipment receives physical uplink control channel configuration information.

In this step, the user equipment receives the physical uplink control channel PUCCH configuration information, and the user equipment may transmit uplink control information according to the PUCCH configuration information.

Specifically, the PUCCH configuration information may include indication information indicating a serving cell carrying a physical uplink control channel, where the indication information may be a cell index of the serving cell carrying the PUCCH. The indication information indicating the serving cell carrying the physical uplink control channel indicates N serving cells transmitting the PUCCH. N may be greater than 1, and in this case, the indication information instructs the UE to transmit the PUCCH on multiple serving cells. In this case, if the PUCCH configuration information does not include the information indicating the N serving cells transmitting the PUCCH, the UE transmits the PUCCH only on a primary carrier. N may also be equal to 1, and in this case, the serving cell transmitting the PUCCH is a primary serving cell of the user equipment.

Further, the PUCCH configuration information may further include indication information indicating a serving cell in a serving cell set corresponding to each serving cell of the N serving cells transmitting the PUCCH, where the indication information may be a cell index of the serving cell in the serving cell set, and the indication information may indicate serving cells whose uplink control information, for example, an HARQ-ACK, needs to be carried on each serving cell transmitting the PUCCH. The serving cell set may include multiple serving cells, and when the serving cell set includes only one serving cell, the serving cell in the serving cell set is the same as the serving cell transmitting the PUCCH.

Further, the PUCCH configuration information may further include a PUCCH format corresponding to each serving cell of the N serving cells transmitting the PUCCH, where the format may be one of a PUCCH format 1a, a PUCCH format 1b, channel selection, and a PUCCH format 3.

Step 1802: The user equipment determines, according to the physical uplink control channel configuration information, a serving cell carrying a physical uplink control channel.

Specifically, the user equipment may determine, according to the indication information indicating the serving cell carrying the physical uplink control channel in the physical uplink control channel configuration information, the serving cell carrying the physical uplink control channel.

This step may further include: determining, by the UE according to the PUCCH configuration information, the serving cell in the serving cell set corresponding to each serving cell transmitting the PUCCH, that is, determining serving cells whose uplink control information, for example, the HARQ-ACK, is carried on each PUCCH.

Step 1803: The user equipment sends uplink control information by using the physical uplink control channel on the serving cell carrying the physical uplink control channel.

In this step, the user equipment sends the corresponding uplink control information by using a corresponding PUCCH on each serving cell carrying the PUCCH, for example, the uplink control information is the HARQ-ACK.

This embodiment provides the uplink control information transmission method, which resolves a problem of how to transmit uplink control information in a scenario of aggregation of different duplexing modes and/or aggregation between base stations. In this method, the base station may configure, flexibly according to an actual scenario, a serving cell transmitting a PUCCH, so that HARQ-ACK timing of each serving cell may be reused, and standard effort is not introduced; therefore, the method is applicable to carrier aggregation between base stations.

Figure 19:
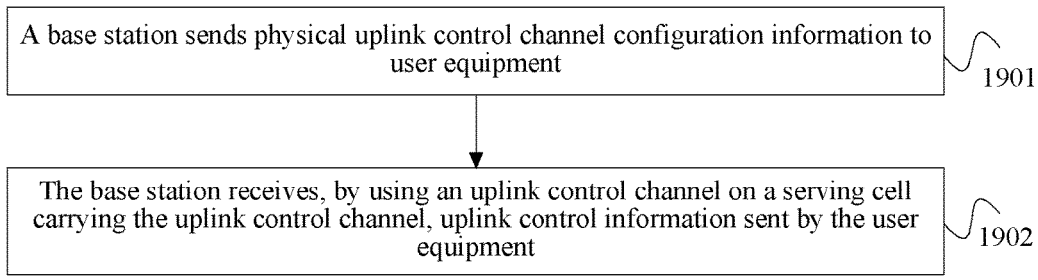
FIG. 19 is a flowchart of Embodiment 12 of an uplink control information transmission method according to the present invention.

FIG. 19 is a flowchart of Embodiment 12 of an uplink control information transmission method according to the present invention. This embodiment describes, from the perspective of a base station, the method corresponding to Embodiment 11. As shown in FIG. 19, for uplink control information transmission in a scenario of aggregation of different duplexing modes and/or aggregation between base stations, the transmission method may specifically include the following steps:

Step 1901: A base station sends physical uplink control channel configuration information to user equipment.

In this step, the base station sends the physical uplink control channel configuration information to the user equipment, so that the user equipment can send the uplink control information according to the physical uplink control channel configuration information.

For other explanations of the PUCCH configuration information, refer to the explanation of step 1801 in the foregoing embodiment, and details are not described herein again.

Step 1902: The base station receives, by using an uplink control channel on a serving cell carrying the uplink control channel, uplink control information sent by the user equipment.

In this step, the user equipment sends the corresponding uplink control information by using a corresponding PUCCH on each serving cell carrying the PUCCH, for example, the uplink control information is the HARQ-ACK.

This embodiment provides the uplink control information transmission method, which resolves a problem of how to transmit uplink control information in a scenario of aggregation of different duplexing modes and/or aggregation between base stations. In this method, the base station may configure, flexibly according to an actual scenario, a serving cell transmitting a PUCCH, so that HARQ-ACK timing of each serving cell may be reused, and standard flexibility is not introduced; therefore, the method is applicable to carrier aggregation between base stations.

Figure 20:
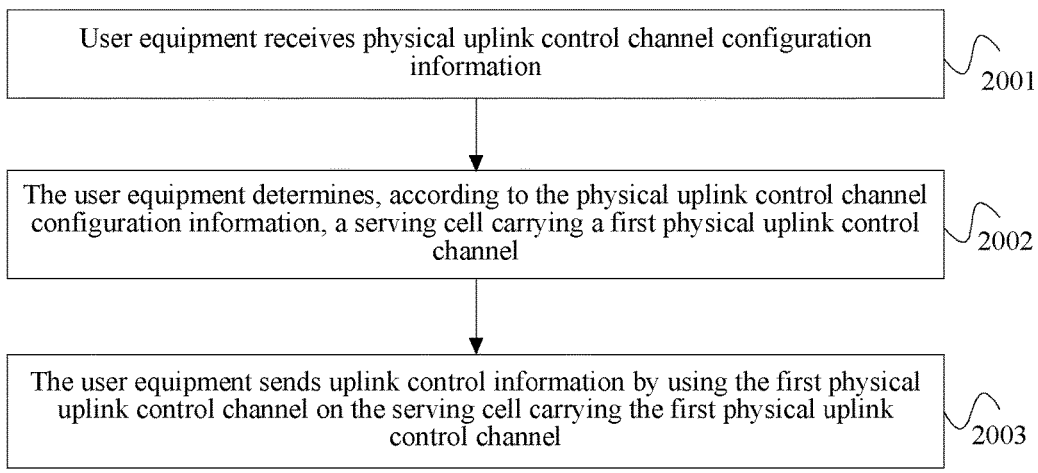
FIG. 20 is a flowchart of Embodiment 13 of an uplink control information transmission method according to the present invention.

FIG. 20 is a flowchart of Embodiment 13 of an uplink control information transmission method according to the present invention. As shown in FIG. 20, for uplink control information transmission in a scenario of aggregation of different duplexing modes and/or aggregation between base stations, the uplink control information transmission method may specifically include the following steps:

Step 2001: User equipment receives physical control channel configuration information.

In this step, the user equipment receives the physical uplink control channel PUCCH configuration information, and the user equipment may transmit uplink control information according to the PUCCH configuration information.

Specifically, the PUCCH configuration information may include indication information indicating a serving cell carrying a first physical uplink control channel, where the indication information may be a cell index of the serving cell carrying the first physical uplink control channel, and the serving cell carrying the first physical uplink control channel may be a secondary serving cell of the user equipment. It may also be configured according to the indication information indicating the serving cell carrying the first physical uplink control channel that the first physical uplink control channel and a second physical uplink control channel of the user equipment are used to transmit the uplink control information of the user equipment together, for example, in this case, the second physical uplink control channel of the user equipment is a physical uplink control channel transmitted on a primary serving cell of the user equipment. If the first physical uplink control channel is configured according to the PUCCH configuration information, the user equipment transmits the uplink control information by using the first physical uplink control channel and the second physical uplink control channel Compared with a case in which the PUCCH is transmitted only on the primary serving cell of the user equipment, in this manner, HARQ-ACK timing of each serving cell may not be changed. If the PUCCH configuration information does not include configuration information of the first physical uplink control channel, the user equipment transmits the uplink control information only on the primary serving cell. The user equipment may transmit the uplink control information by using the first physical uplink control channel and the second physical uplink control channel in the following manner: If the primary serving cell corresponds to an uplink subframe, the user equipment transmits the uplink control information on the second physical uplink control channel; otherwise, the user equipment transmits the uplink control information on the first physical uplink control channel.

The PUCCH configuration information may further include indication information indicating a format of the first physical uplink control channel, where a format of the first physical uplink control channel may be one of a PUCCH format 1a, a PUCCH format 1b, channel selection, and a PUCCH format 3.

Step 2002: The user equipment determines, according to the physical uplink control channel configuration information, a serving cell carrying a first physical uplink control channel.

In this step, the user equipment determines, according to the physical uplink control channel configuration information received in step 2001, the serving cell carrying the first physical uplink control channel.

Specifically, the user equipment may determine, according to the indication information indicating the serving cell carrying the first physical uplink control channel in the physical uplink control channel configuration information, the serving cell carrying the first physical uplink control channel; further, the user equipment may determine, according to a cell index of the serving cell carrying the first uplink control channel in the physical uplink control channel configuration information, the serving cell carrying the first physical uplink control channel, where the serving cell carrying the first physical uplink control channel is a secondary serving cell of the user equipment.

Step 2003: The user equipment sends uplink control information by using the first physical uplink control channel on the serving cell carrying the first physical uplink control channel.

This step may be: when the primary serving cell corresponds to an uplink subframe, the user equipment transmits the uplink control information on the second physical uplink control channel; otherwise, the user equipment transmits the uplink control information on the first physical uplink control channel.

It should be noted that, the uplink control information (Uplink Control Information, UCI for short) in this step may be a hybrid automatic repeat request HARQ-ACK, channel state information (Channel State Information, CSI for short), a scheduling request (Scheduling Request, SR for short), or the like. A type of the first uplink control information may be the same as or different from a type of the second uplink control information.

This embodiment provides the uplink control information transmission method, which resolves a problem of how to transmit uplink control information in a scenario of aggregation of different duplexing modes and/or aggregation between base stations.

Figure 21:
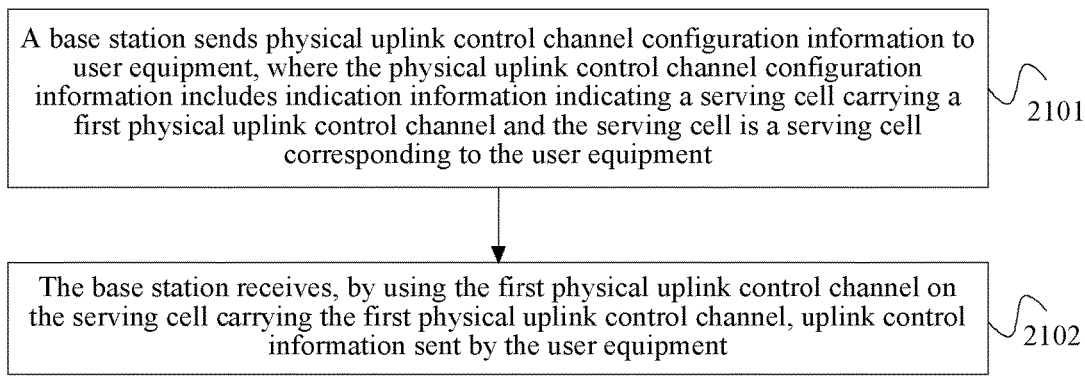
FIG. 21 is a flowchart of Embodiment 14 of an uplink control information transmission method according to the present invention.

FIG. 21 is a flowchart of Embodiment 14 of an uplink control information transmission method according to the present invention. As shown in FIG. 21, for uplink control information transmission in a scenario of aggregation of different duplexing modes and/or aggregation between base stations, the uplink control information transmission method may specifically include the following steps:

Step 2101: A base station sends physical uplink control channel configuration information to user equipment, where the physical uplink control channel configuration information includes indication information indicating a serving cell carrying a first physical uplink control channel and the serving cell is a serving cell corresponding to the user equipment.

In this step, the base station sends the physical uplink control channel configuration information to the user equipment, so that the user equipment can send the uplink control information according to the physical uplink control channel configuration information.

Specifically, the indication information indicating the serving cell carrying the first physical uplink control channel may be a cell index of the serving cell carrying the first physical uplink control channel, and the serving cell carrying the first physical uplink control channel may be a secondary serving cell of the user equipment.

For other explanations of the PUCCH configuration information, refer to the explanation of step 2001, and details are not described herein again.

Step 2102: The base station receives, by using the first physical uplink control channel on the serving cell carrying the first physical uplink control channel, uplink control information sent by the user equipment.

This step may be: when the primary serving cell corresponds to an uplink subframe, receiving, by the base station, the uplink control information on a second physical uplink control channel; otherwise, receiving, by the base station, the uplink control information on the first physical uplink control channel.

It should be noted that the uplink control information UCI in this step may be a hybrid automatic repeat request HARQ-ACK, channel state information CSI, a scheduling request, or the like. A type of the first uplink control information may be the same as or different from a type of the second uplink control information.

This embodiment provides the uplink control information transmission method, which resolves a problem of how to transmit uplink control information in a scenario of aggregation of different duplexing modes and/or aggregation between base stations.

Figure 22:
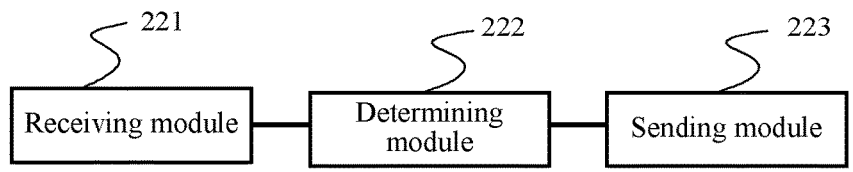
FIG. 22 is a schematic structural diagram of Embodiment 4 of user equipment according to the present invention.

FIG. 22 is a schematic structural diagram of Embodiment 4 of user equipment according to the present invention. As shown in FIG. 22, the user equipment provided in this embodiment includes a receiving module 221, a determining module 222, and a sending module 223, where the receiving module 221 is configured to receive a downlink control channel carried on a first serving cell of the UE, where the downlink control channel is used to indicate PDSCH transmission carried on a second serving cell of the UE, a duplexing mode of the first serving cell is time division duplexing TDD, and a duplexing mode of the second serving cell is frequency division duplexing FDD;

the determining module 222 is configured to determine a physical uplink control channel PUCCH resource; and the sending module 223 is configured to send an HARQ-ACK of a PDSCH according to the PUCCH resource by using a PUCCH carried on the second serving cell of the UE.

Optionally, the determining module 222 is specifically configured to determine the PUCCH resource according to a TPC command field in a DCI format of the downlink control channel carried on the first serving cell.

Optionally, the determining module 222 is specifically configured to determine the PUCCH resource according to higher layer signaling.

Optionally, the determining module 222 is specifically configured to determine the PUCCH resource according to a predefined field in the DCI format of the downlink control channel carried on the first serving cell.

Optionally, the determining module 222 is specifically configured to determine the PUCCH resource according to an HARQ-ACK resource offset field in the DCI format of the downlink control channel carried on the first serving cell.

In this embodiment, the downlink control channel is used to indicate physical downlink shared channel PDSCH transmission carried on the first serving cell, or is used to indicate downlink semi-persistent scheduling SPS releasing. When the downlink control channel is used to indicate the physical downlink shared channel PDSCH transmission, a hybrid automatic repeat request-acknowledgement corresponding to the downlink control channel is specifically a hybrid automatic repeat request-acknowledgement of a PDSCH corresponding to the downlink control channel; and when the downlink control channel is used to indicate the downlink semi-persistent scheduling SPS releasing, the hybrid automatic repeat request-acknowledgement corresponding to the downlink control channel is specifically a hybrid automatic repeat request-acknowledgement corresponding to the downlink control channel indicating the downlink semi-persistent scheduling SPS releasing.

In this embodiment, the first serving cell may be a primary serving cell of the UE, the duplexing mode of the first serving cell is time division duplexing TDD, the duplexing mode of the second serving cell is frequency division duplexing FDD, and the second serving cell is a secondary serving cell, used to transmit the PUCCH, indicated by higher layer signaling or the second serving cell is a secondary serving cell, having a smallest cell index, of the UE.

The user equipment provided in this embodiment may be configured to execute the technical solutions provided in method embodiment 7. Specific implementation manners and technical effects are similar to those of the method, and details are not described herein again.

Figure 23:
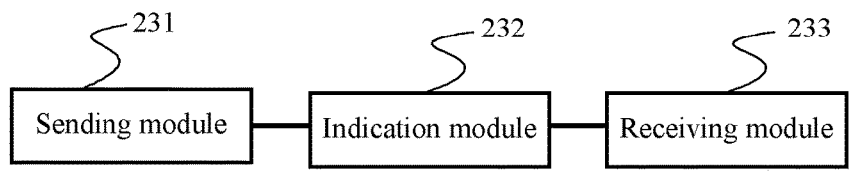
FIG. 23 is a schematic structural diagram of Embodiment 4 of a base station according to the present invention.

As shown in FIG. 23, the base station provided in this embodiment includes a sending module 231, an indication module 232, and a receiving module 233, where the sending module 231 is configured to send a downlink control channel to UE on a first serving cell of the UE, where the downlink control channel is used to indicate PDSCH transmission carried on a second serving cell of the UE, a duplexing mode of the first serving cell is time division duplexing TDD, and a duplexing mode of the second serving cell is frequency division duplexing FDD;

the indication module 232 is configured to indicate a physical uplink control channel PUCCH resource; and the receiving module 233 is configured to receive, according to the PUCCH resource, an HARQ-ACK, sent by the UE by using a PUCCH carried on the second serving cell of the UE, of a PDSCH.

Optionally, the indication module 232 is specifically configured to indicate the PUCCH resource by using a TPC command field in a DCI format of the downlink control channel carried on the first serving cell.

Optionally, the indication module 232 is specifically configured to indicate the PUCCH resource by using higher layer signaling.

Optionally, the indication module 232 is specifically configured to indicate the PUCCH resource by using a predefined field in the DCI format of the downlink control channel carried on the first serving cell.

Optionally, the indication module 232 is specifically configured to indicate the PUCCH resource by using an HARQ-ACK resource offset field in the DCI format of the downlink control channel carried on the first serving cell.

In this embodiment, the downlink control channel is used to indicate physical downlink shared channel PDSCH transmission carried on the first serving cell, or is used to indicate downlink semi-persistent scheduling SPS releasing. When the downlink control channel is used to indicate the physical downlink shared channel PDSCH transmission, a hybrid automatic repeat request-acknowledgement corresponding to the downlink control channel is specifically a hybrid automatic repeat request-acknowledgement of a PDSCH corresponding to the downlink control channel; and when the downlink control channel is used to indicate the downlink semi-persistent scheduling SPS releasing, the hybrid automatic repeat request-acknowledgement corresponding to the downlink control channel is specifically a hybrid automatic repeat request-acknowledgement corresponding to the downlink control channel indicating the downlink semi-persistent scheduling SPS releasing.

In this embodiment, the first serving cell may be a primary serving cell of the UE, the duplexing mode of the first serving cell is time division duplexing TDD, the duplexing mode of the second serving cell is frequency division duplexing FDD, and the second serving cell is a secondary serving cell, used to transmit the PUCCH, indicated by higher layer signaling or the second serving cell is a secondary serving cell, having a smallest cell index, of the UE.

The base station provided in this embodiment may be configured to execute the technical solutions provided in method embodiment 8. Specific implementation manners and technical effects are similar to those of the method, and details are not described herein again.

Figure 24:
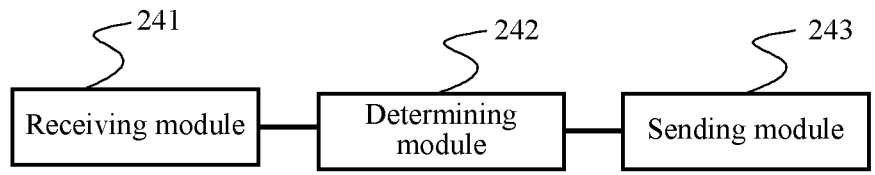
FIG. 24 is a schematic structural diagram of Embodiment 5 of user equipment according to the present invention.

FIG. 24 is a schematic structural diagram of Embodiment 5 of user equipment according to the present invention. As shown in FIG. 24, the user equipment provided in this embodiment includes a receiving module 241, a determining module 242, and a sending module 243, where the receiving module 241 is configured to receive a downlink control channel carried on a first serving cell of the UE, where the downlink control channel is used to indicate PDSCH transmission carried on a second serving cell of the UE, a duplexing mode of the first serving cell is time division duplexing TDD, and a duplexing mode of the second serving cell is frequency division duplexing FDD;

the determining module 242 is configured to determine a physical uplink control channel PUCCH resource; and the sending module 243 is configured to send an HARQ-ACK of a PDSCH according to the PUCCH resource by using a PUCCH carried on the second serving cell of the UE.

Optionally, the determining module 242 is specifically configured to determine the PUCCH resource according to a TPC command field in a DCI format of the downlink control channel carried on the first serving cell.

Optionally, the determining module 242 is specifically configured to determine the PUCCH resource according to higher layer signaling.

Optionally, the determining module 242 is specifically configured to determine the PUCCH resource according to a predefined field in the DCI format of the downlink control channel carried on the first serving cell.

Optionally, the determining module 242 is specifically configured to determine the PUCCH resource according to an HARQ-ACK resource offset field in the DCI format of the downlink control channel carried on the first serving cell.

The user equipment provided in this embodiment may be configured to execute the technical solutions provided in method embodiment 9. Specific implementation manners and technical effects are similar to those of the method, and details are not described herein again.

Figure 25:
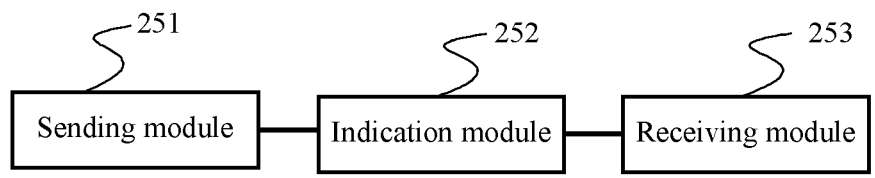
FIG. 25 is a schematic structural diagram of Embodiment 5 of a base station according to the present invention.

FIG. 25 is a schematic structural diagram of Embodiment 5 of a base station according to the present invention. As shown in FIG. 25, the base station provided in this embodiment includes a sending module 251, an indication module 252, and a receiving module 253, where the sending module 251 is configured to send a downlink control channel to UE on a first serving cell of the UE, where the downlink control channel is used to indicate PDSCH transmission carried on a second serving cell of the UE, a duplexing mode of the first serving cell is time division duplexing TDD, and a duplexing mode of the second serving cell is frequency division duplexing FDD;

the indication module 252 is configured to indicate a physical uplink control channel PUCCH resource; and the receiving module 253 is configured to receive, according to the PUCCH resource, an HARQ-ACK, sent by the UE by using a PUCCH carried on the second serving cell of the UE, of a PDSCH.

Optionally, the indication module 232 is specifically configured to indicate the PUCCH resource by using a TPC command field in a DCI format of the downlink control channel carried on the first serving cell.

Optionally, the indication module 252 is specifically configured to indicate the PUCCH resource by using higher layer signaling.

Optionally, the indication module 252 is specifically configured to indicate the PUCCH resource by using a predefined field in the DCI format of the downlink control channel carried on the first serving cell.

Optionally, the indication module 252 is specifically configured to indicate the PUCCH resource by using an HARQ-ACK resource offset field in the DCI format of the downlink control channel carried on the first serving cell.

In this embodiment, the downlink control channel is used to indicate physical downlink shared channel PDSCH transmission carried on the first serving cell, or is used to indicate downlink semi-persistent scheduling SPS releasing. When the downlink control channel is used to indicate the physical downlink shared channel PDSCH transmission, a hybrid automatic repeat request-acknowledgement corresponding to the downlink control channel is specifically a hybrid automatic repeat request-acknowledgement of a PDSCH corresponding to the downlink control channel; and when the downlink control channel is used to indicate the downlink semi-persistent scheduling SPS releasing, the hybrid automatic repeat request-acknowledgement corresponding to the downlink control channel is specifically a hybrid automatic repeat request-acknowledgement corresponding to the downlink control channel indicating the downlink semi-persistent scheduling SPS releasing.

In this embodiment, the first serving cell may be a primary serving cell of the UE, the duplexing mode of the first serving cell is time division duplexing TDD, the duplexing mode of the second serving cell is frequency division duplexing FDD, and the second serving cell is a secondary serving cell, used to transmit the PUCCH, indicated by higher layer signaling or the second serving cell is a secondary serving cell, having a smallest cell index, of the UE.

The base station provided in this embodiment may be configured to execute the technical solutions provided in method embodiment 10. Specific implementation manners and technical effects are similar to those of the method, and details are not described herein again.

Figure 26:
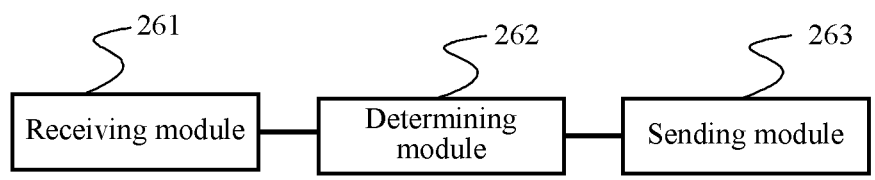
FIG. 26 is a schematic structural diagram of Embodiment 6 of user equipment according to the present invention.

FIG. 26 is a schematic structural diagram of Embodiment 6 of user equipment according to the present invention. As shown in FIG. 26, the user equipment provided in this embodiment includes a receiving module 261, a determining module 262, and a sending module 263, where the receiving module 261 is configured to receive physical uplink control channel configuration information;

the determining module 262 is configured to determine, according to the physical uplink control channel configuration information, a serving cell carrying a physical uplink control channel; and the sending module 263 is configured to send uplink control information by using the physical uplink control channel on the serving cell carrying the physical uplink control channel.

Optionally, the PUCCH configuration information may include indication information indicating the serving cell carrying the physical uplink control channel, where the indication information may be a cell index of the serving cell carrying the PUCCH.

Optionally, the PUCCH configuration information may further include indication information indicating a serving cell in a serving cell set corresponding to each serving cell of N serving cells transmitting the PUCCH, where the indication information may be a cell index of the serving cell in the serving cell set, and the indication information may indicate serving cells whose uplink control information needs to be carried on each serving cell transmitting the PUCCH.

Optionally, the PUCCH configuration information may further include a PUCCH format corresponding to each serving cell of the N serving cells transmitting the PUCCH.

In this embodiment, the user equipment receives the physical uplink control channel PUCCH configuration information, and then, transmits the uplink control information according to the PUCCH configuration information.

The user equipment provided in this embodiment may be configured to execute the technical solutions provided in method embodiment 11. Specific implementation manners and technical effects are similar to those of the method, and details are not described herein again.

Figure 27:
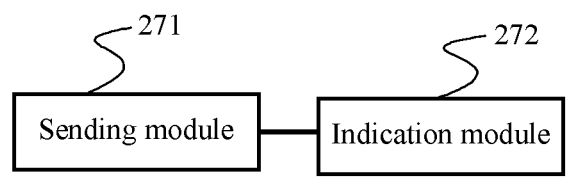
FIG. 27 is a schematic structural diagram of Embodiment 6 of a base station according to the present invention.

FIG. 27 is a schematic structural diagram of Embodiment 6 of a base station according to the present invention. As shown in FIG. 27, the base station provided in this embodiment includes a sending module 271 and an indication module 272, where the sending module 271 is configured to send physical uplink control channel configuration information to user equipment; and the receiving module 272 is configured to receive, by using an uplink control channel on a serving cell carrying the uplink control channel, uplink control information sent by the user equipment.

Optionally, the PUCCH configuration information may include indication information indicating a serving cell carrying a physical uplink control channel, where the indication information may be a cell index of the serving cell carrying the PUCCH.

Optionally, the PUCCH configuration information may further include indication information indicating a serving cell in a serving cell set corresponding to each serving cell of N serving cells transmitting the PUCCH, where the indication information may be a cell index of the serving cell in the serving cell set, and the indication information may indicate serving cells whose uplink control information needs to be carried on each serving cell transmitting the PUCCH.

Optionally, the PUCCH configuration information may further include a PUCCH format corresponding to each serving cell of the N serving cells transmitting the PUCCH.

The base station sends the physical uplink control channel configuration information to the user equipment, so that the user equipment can send the uplink control information according to the physical uplink control channel configuration information.

The base station provided in this embodiment may be configured to execute the technical solutions provided in method embodiment 12. Specific implementation manners and technical effects are similar to those of the method, and details are not described herein again.

Figure 28:
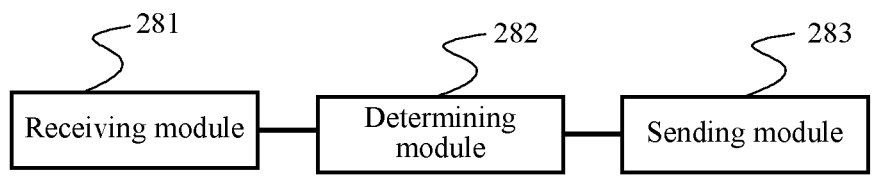
FIG. 28 is a schematic structural diagram of Embodiment 7 of user equipment according to the present invention.

FIG. 28 is a schematic structural diagram of Embodiment 7 of user equipment according to the present invention. As shown in FIG. 28, the user equipment provided in this embodiment includes a receiving module 281, a determining module 282, and a sending module 283, where the receiving module 281 is configured to receive physical uplink control channel configuration information;

the determining module 282 is configured to determine, according to the physical uplink control channel configuration information, a serving cell carrying a first physical uplink control channel; and the sending module 283 is configured to send uplink control information by using the first physical uplink control channel on the serving cell carrying the first physical uplink control channel.

The user equipment receives the physical uplink control channel PUCCH configuration information, and transmits the uplink control information according to the PUCCH configuration information.

The PUCCH configuration information may include indication information indicating a serving cell carrying a first physical uplink control channel, where the indication information may be a cell index of the serving cell carrying the first PUCCH.

Optionally, the PUCCH configuration information may further include indication information of a PUCCH format, where a format of the first physical uplink control channel may be any one of a PUCCH format 1a, a PUCCH format 1b, channel selection, and a PUCCH format 3.

The user equipment provided in this embodiment may be configured to execute the technical solutions provided in method embodiment 13. Specific implementation manners and technical effects are similar to those of the method.

Figure 29:
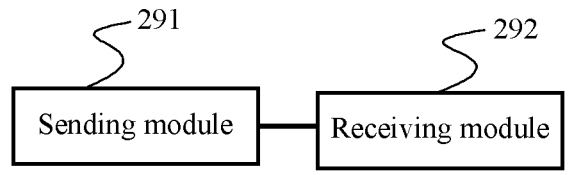
FIG. 29 is a schematic structural diagram of Embodiment 7 of a base station according to the present invention.

FIG. 29 is a schematic structural diagram of Embodiment 7 of a base station according to the present invention. As shown in FIG. 29, the base station provided in this embodiment includes a sending module 291 and a receiving module 292, where the sending module 291 is configured to send physical uplink control channel configuration information to user equipment, where the physical uplink control channel configuration information includes indication information indicating a serving cell carrying a first physical uplink control channel and the serving cell is a serving cell corresponding to the user equipment; and the receiving module 292 is configured to receive, by using the first physical uplink control channel on the serving cell carrying the first physical uplink control channel, uplink control information sent by the user equipment.

The indication information indicating the serving cell carrying the first physical uplink control channel is a cell index of the serving cell carrying the first physical uplink control channel, and the serving cell carrying the first physical uplink control channel is a secondary serving cell of the user equipment.

The PUCCH configuration information may include the indication information indicating the serving cell carrying the first physical uplink control channel, where the indication information may be a cell index of the serving cell carrying the first PUCCH.

Optionally, the PUCCH configuration information may further include indication information of a PUCCH format, where a format of the first physical uplink control channel may be any one of a PUCCH format 1a, a PUCCH format 1b, channel selection, and a PUCCH format 3.

The base station provided in this embodiment may be configured to execute the technical solutions provided in method embodiment 14. Specific implementation manners and technical effects are similar to those of the method, and details are not described herein again.

Figure 30:
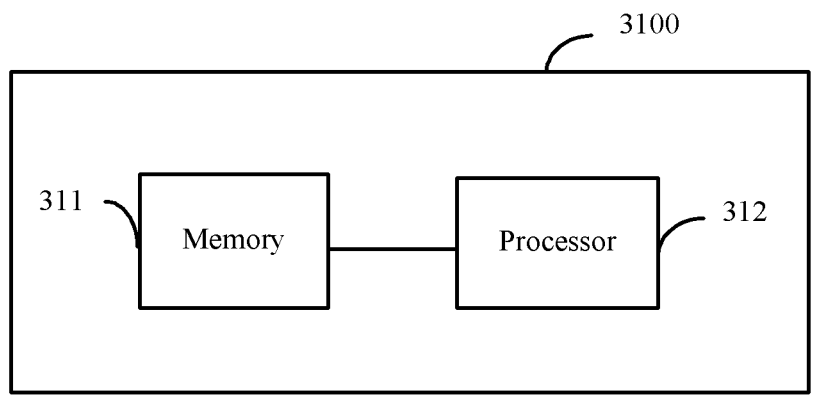
FIG. 30 is a schematic structural diagram of Embodiment 8 of user equipment according to the present invention.

FIG. 30 is a schematic structural diagram of Embodiment 8 of user equipment according to the present invention. As shown in FIG. 30, the user equipment UE 3100 provided in this embodiment may include a memory 311 and a processor 312, where the memory 311 stores a group of program code, and the processor 312 is configured to invoke the program code stored in the memory 311 and perform the following operations:

receiving, in a downlink subframe N, a downlink control channel sent by a base station, where the downlink control channel is carried on a first serving cell of the UE; and sending a hybrid automatic repeat request-acknowledgement corresponding to the downlink control channel to the base station in an uplink subframe N+4 by using a physical uplink control channel PUCCH, where when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, where a duplexing mode of the first serving cell is different from a duplexing mode of the second serving cell, the sum of a quantity of uplink subframes included in the first uplink subframe set and a quantity of uplink subframes included in the second uplink subframe set is equal to a quantity of subframes in a radio frame, and an uplink subframe included in the first uplink subframe set and an uplink subframe included in the second uplink subframe set correspond to different subframes in the radio frame.

When the duplexing mode of the first serving cell is time division duplexing TDD and the duplexing mode of the second serving cell is frequency division duplexing FDD, the uplink subframe included in the second uplink subframe set corresponds to an uplink subframe, in a radio frame, of the first serving cell and the uplink subframe included in the first uplink subframe set corresponds to the other uplink subframe, except the uplink subframe included in the second uplink subframe set, in the radio frame; and when the duplexing mode of the first serving cell is FDD and the duplexing mode of the second serving cell is TDD, the uplink subframe included in the first uplink subframe set corresponds to an uplink subframe, in a radio frame, of the first serving cell and the uplink subframe included in the second uplink subframe set corresponds to the other uplink subframe, except the uplink subframe included in the first uplink subframe set, in the radio frame.

In this embodiment, the downlink control channel is a physical downlink control channel PDCCH or an enhanced physical downlink control channel EPDCCH, and the downlink control channel is used to indicate physical downlink shared channel PDSCH transmission carried on the first serving cell, or is used to indicate downlink semi-persistent scheduling SPS releasing. When the downlink control channel is used to indicate the PDSCH transmission, a hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

The processor 312 is further configured to acquire a PUCCH resource and/or a PUCCH transmit power of the PUCCH. When the uplink subframe N+4 belongs to the first uplink subframe set, the processor 312 is specifically configured to determine the PUCCH resource according to a transmit power control TPC command field in a downlink control information DCI format of the downlink control channel. When the uplink subframe N+4 belongs to the second uplink subframe set, the processor 312 is specifically configured to determine the PUCCH transmit power according to the transmit power control TPC command field in the downlink control information DCI format of the downlink control channel.

The user equipment provided in this embodiment may be configured to execute the technical solutions in method embodiment 1. Specific implementation manners and technical effects are similar to those of the method, and details are not described herein again.

Figure 31:
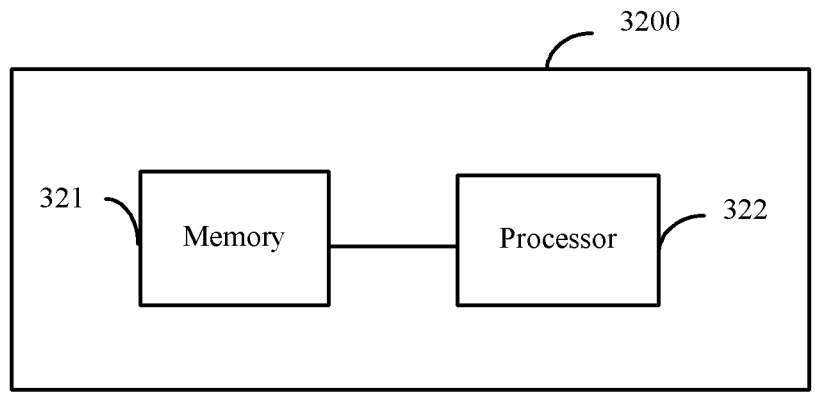
FIG. 31 is a schematic structural diagram of Embodiment 8 of a base station according to the present invention.

FIG. 31 is a schematic structural diagram of Embodiment 8 of a base station according to the present invention. As shown in FIG. 31, the base station 3200 provided in this embodiment may include a memory 321 and a processor 322, where the memory 321 stores a group of program code, and the processor 322 is configured to invoke the program code stored in the memory 321 and perform the following operations:

sending a downlink control channel to user equipment UE in a downlink subframe N, where the downlink control channel is carried on a first serving cell of the UE; and receiving, in an uplink subframe N+4, a hybrid automatic repeat request-acknowledgement that is sent by the UE by using a physical uplink control channel PUCCH and corresponds to the downlink control channel, where when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, where a duplexing mode of the first serving cell is different from a duplexing mode of the second serving cell, the sum of a quantity of uplink subframes included in the first uplink subframe set and a quantity of uplink subframes included in the second uplink subframe set is equal to a quantity of subframes in a radio frame, and an uplink subframe included in the first uplink subframe set and an uplink subframe included in the second uplink subframe set correspond to different subframes in the radio frame.

When the duplexing mode of the first serving cell is time division duplexing TDD and the duplexing mode of the second serving cell is frequency division duplexing FDD, the uplink subframe included in the second uplink subframe set corresponds to an uplink subframe, in a radio frame, of the first serving cell and the uplink subframe included in the first uplink subframe set corresponds to the other uplink subframe, except the uplink subframe included in the second uplink subframe set, in the radio frame; and when the duplexing mode of the first serving cell is FDD and the duplexing mode of the second serving cell is TDD, the uplink subframe included in the first uplink subframe set corresponds to an uplink subframe, in a radio frame, of the first serving cell and the uplink subframe included in the second uplink subframe set corresponds to the other uplink subframe, except the uplink subframe included in the first uplink subframe set, in the radio frame.

In this embodiment, the downlink control channel is a physical downlink control channel PDCCH or an enhanced physical downlink control channel EPDCCH, and the downlink control channel is used to indicate physical downlink shared channel PDSCH transmission carried on the first serving cell, or is used to indicate downlink semi-persistent scheduling SPS releasing. When the downlink control channel is used to indicate the PDSCH transmission, a hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

The base station provided in this embodiment may be configured to execute the technical solutions provided in method embodiment 2. Specific implementation manners and technical effects are similar to those of the method, and details are not described herein again.

Figure 32:
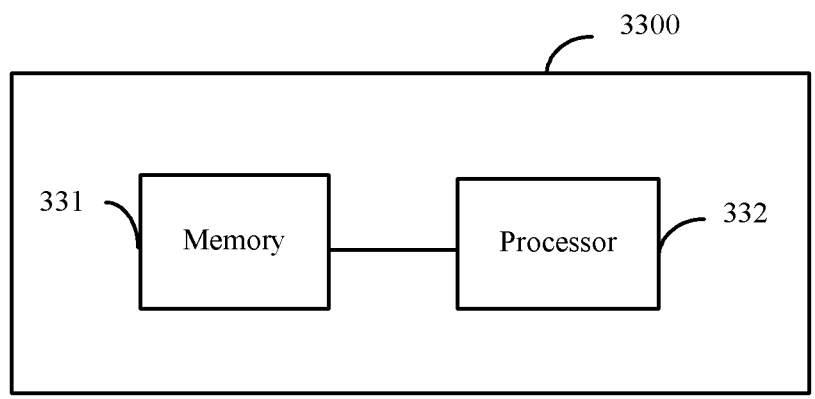
FIG. 32 is a schematic structural diagram of Embodiment 9 of user equipment according to the present invention.

FIG. 32 is a schematic structural diagram of Embodiment 9 of user equipment according to the present invention. As shown in FIG. 32, the user equipment UE 3300 provided in this embodiment may include a memory 331 and a processor 332, where the memory 331 stores a group of program code, and the processor 332 is configured to invoke the program code stored in the memory 331 and perform the following operations:

receiving a downlink control channel in a downlink subframe N, where the downlink control channel is carried on a first serving cell of the UE and a duplexing mode of the first serving cell is time division duplexing TDD; and sending, in an uplink subframe N+4 by using a physical uplink control channel PUCCH, a hybrid automatic repeat request-acknowledgement corresponding to the downlink control channel, where the PUCCH is carried on a second serving cell of the UE and a duplexing mode of the second serving cell is frequency division duplexing FDD.

The downlink control channel is a physical downlink control channel PDCCH or an enhanced physical downlink control channel EPDCCH, and the downlink control channel is used to indicate physical downlink shared channel PDSCH transmission carried on the first serving cell, or is used to indicate downlink semi-persistent scheduling SPS releasing. When the downlink control channel is used to indicate the PDSCH transmission, a hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

In this embodiment, before sending, in the uplink subframe N+4 by using the physical uplink control channel PUCCH, the hybrid automatic repeat request-acknowledgement corresponding to the downlink control channel, the processor 332 is further configured to acquire a PUCCH resource of the PUCCH. The acquiring, by the processor 332, a PUCCH resource of the PUCCH is specifically: determining the PUCCH resource according to a downlink allocation indication DAI or a transmit power control TPC command in a downlink control information DCI format of the downlink control channel.

In this embodiment, the first serving cell is a primary serving cell of the UE and the second serving cell is a secondary serving cell of the UE. Specifically, the second serving cell may be specifically a secondary serving cell, having a smallest cell index, of the UE, or the second serving cell is a secondary serving cell, used to transmit the PUCCH, indicated by higher layer signaling.

The user equipment provided in this embodiment may be configured to execute the technical solutions provided in method embodiment 3. Specific implementation manners and technical effects are similar to those of the method, and details are not described herein again.

Figure 33:
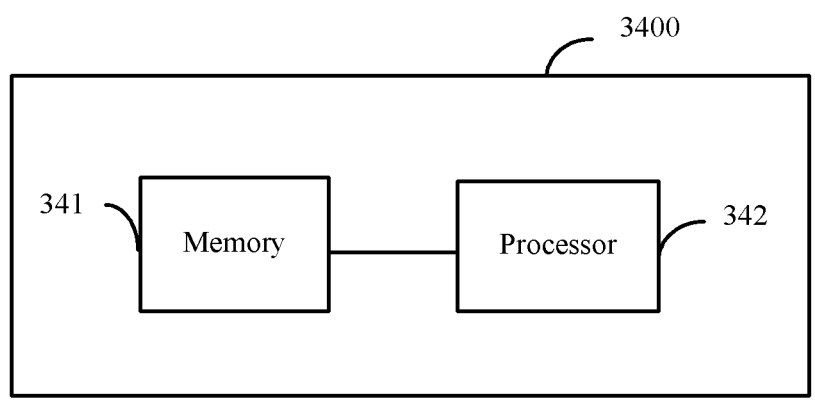
FIG. 33 is a schematic structural diagram of Embodiment 9 of a base station according to the present invention.

FIG. 33 is a schematic structural diagram of Embodiment 9 of a base station according to the present invention. As shown in FIG. 33, the base station 3400 provided in this embodiment may include a memory 341 and a processor 342, where the memory 341 stores a group of program code, and the processor 342 is configured to invoke the program code stored in the memory 341 and perform the following operations:

sending a downlink control channel to user equipment UE in a downlink subframe N, where the downlink control channel is carried on a first serving cell of the UE, a duplexing mode of the first serving cell is time division duplexing TDD, and a downlink allocation indication DAI or a transmit power control TPC command in a downlink control information DCI format of the downlink control channel is used to indicate a physical uplink control channel PUCCH resource; and receiving, in an uplink subframe N+4 according to the PUCCH resource, a hybrid automatic repeat request-acknowledgement that is sent by the UE by using a PUCCH and corresponds to the downlink control channel, where the PUCCH is carried on a second serving cell of the UE and a duplexing mode of the second serving cell is frequency division duplexing FDD.

The downlink control channel is a physical downlink control channel PDCCH or an enhanced physical downlink control channel EPDCCH, and the downlink control channel is used to indicate physical downlink shared channel PDSCH transmission carried on the first serving cell, or is used to indicate downlink semi-persistent scheduling SPS releasing. When the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

In this embodiment, the first serving cell is a primary serving cell of the UE and the second serving cell is a secondary serving cell of the UE. Specifically, the second serving cell may be specifically a secondary serving cell, having a smallest cell index, of the UE, or the second serving cell is a secondary serving cell, used to transmit the PUCCH, indicated by the base station by using higher layer signaling.

The base station provided in this embodiment may be configured to execute the technical solutions in method embodiment 4. Specific implementation manners and technical effects are similar to those of the method, and details are not described herein again.

Figure 34:
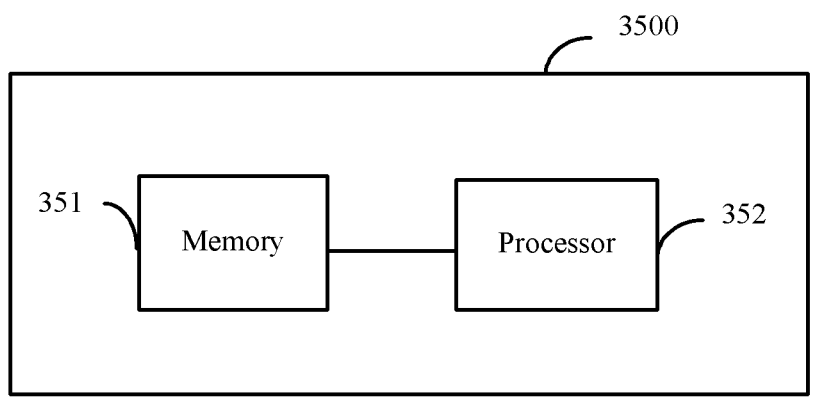
FIG. 34 is a schematic structural diagram of Embodiment 10 of user equipment according to the present invention.

FIG. 34 is a schematic structural diagram of Embodiment 10 of user equipment according to the present invention. As shown in FIG. 34, the user equipment UE 3500 provided in this embodiment may include a memory 351 and a processor 352, where the memory 351 stores a group of program code, and the processor 352 is configured to invoke the program code stored in the memory 351 and perform the following operations:

receiving a downlink control channel in a downlink subframe N, where the downlink control channel is carried on a first serving cell of the UE and the downlink control channel is a physical downlink control channel PDCCH or an enhanced physical downlink control channel EPDCCH;

when a hybrid automatic repeat request-acknowledgement corresponding to the downlink control channel is carried on a second serving cell of the UE, determining, a physical uplink control channel PUCCH resource according to a transmit power control TPC command field in a downlink control information DCI format of the downlink control channel;

when the hybrid automatic repeat request-acknowledgement corresponding to the downlink control channel is carried on the first serving cell, determining, a transmit power of a PUCCH according to the transmit power control TPC command field in the downlink control information DCI format of the downlink control channel, where a duplexing mode of the first serving cell is different from a duplexing mode of the second serving cell; and sending, by using the PUCCH according to the PUCCH resource or the transmit power of the PUCCH, the hybrid automatic repeat request-acknowledgement corresponding to the downlink control channel.

The downlink control channel is used to indicate physical downlink shared channel PDSCH transmission carried on the first serving cell, or is used to indicate downlink semi-persistent scheduling SPS releasing. When the downlink control channel is used to indicate the PDSCH transmission, a hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

In this embodiment, the first serving cell is a primary serving cell of the UE, the duplexing mode of the first serving cell is time division duplexing TDD, the duplexing mode of the second serving cell is frequency division duplexing FDD, and the second serving cell is a secondary serving cell, having a smallest cell index, of the UE. Alternatively, the first serving cell is a primary serving cell of the UE, the duplexing mode of the first serving cell is time division duplexing TDD, the duplexing mode of the second serving cell is frequency division duplexing FDD, and the second serving cell is a secondary serving cell, used to transmit the PUCCH, indicated by higher layer signaling.

The user equipment provided in this embodiment may be configured to execute the technical solutions in method embodiment 5. Specific implementation manners and technical effects are similar to those of the method, and details are not described herein again.

Figure 35:
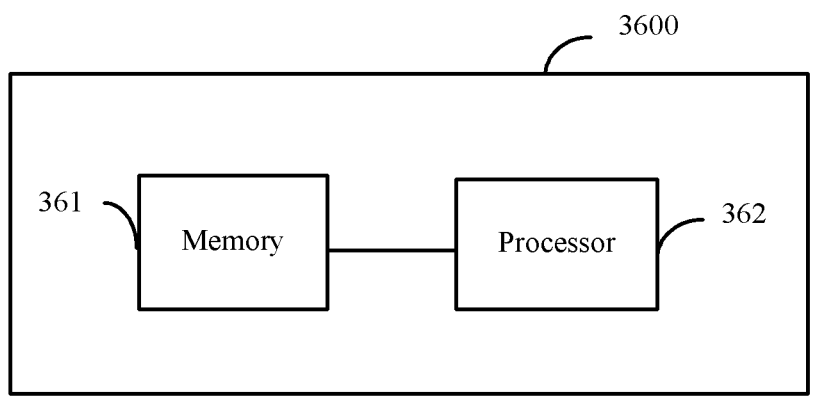
FIG. 35 is a schematic structural diagram of Embodiment 10 of a base station according to the present invention.

FIG. 35 is a schematic structural diagram of Embodiment 10 of a base station according to the present invention. As shown in FIG. 35, the base station 3600 provided in this embodiment may include a memory 361 and a processor 362, where the memory 361 stores a group of program code, and the processor 362 is configured to invoke the program code stored in the memory 361 and perform the following operations:

sending a downlink control channel to user equipment UE in a downlink subframe N, where the downlink channel is carried on a first serving cell of the UE and the downlink control channel is a physical downlink control channel PDCCH or an enhanced physical downlink control channel EPDCCH;

when a hybrid automatic repeat request-acknowledgement corresponding to the downlink control channel is carried on a second serving cell of the UE, indicating a physical uplink control channel PUCCH resource by using a transmit power control TPC command field in a downlink control information DCI format of the downlink control channel;

when the hybrid automatic repeat request-acknowledgement corresponding to the downlink control channel is carried on the first serving cell, indicating a transmit power of the PUCCH according to a transmit power control TPC command field in the downlink control information DCI format of the downlink control channel, where a duplexing mode of the first serving cell is different from a duplexing mode of the second serving cell; and receiving, according to the PUCCH resource, the hybrid automatic repeat request-acknowledgement that is sent by the UE and corresponds to the downlink control channel.

The downlink control channel is used to indicate physical downlink shared channel PDSCH transmission carried on the first serving cell, or is used to indicate downlink semi-persistent scheduling SPS releasing. When the downlink control channel is used to indicate the physical downlink shared channel PDSCH transmission, a hybrid automatic repeat request-acknowledgement corresponding to the downlink control channel is specifically a hybrid automatic repeat request-acknowledgement of a PDSCH corresponding to the downlink control channel; and when the downlink control channel is used to indicate the downlink semi-persistent scheduling SPS releasing, the hybrid automatic repeat request-acknowledgement corresponding to the downlink control channel is specifically a hybrid automatic repeat request-acknowledgement corresponding to the downlink control channel indicating the downlink semi-persistent scheduling SPS releasing.

In this embodiment, the first serving cell may be a primary serving cell of the UE, the duplexing mode of the first serving cell is time division duplexing TDD, the duplexing mode of the second serving cell is frequency division duplexing FDD, and the second serving cell is a secondary serving cell, having a smallest cell index, of the UE. Alternatively, the first serving cell is a primary serving cell of the UE, the duplexing mode of the first serving cell is time division duplexing TDD, the duplexing mode of the second serving cell is frequency division duplexing FDD, and the second serving cell is a secondary serving cell, used to transmit the PUCCH, indicated by higher layer signaling.

The base station provided in this embodiment may be configured to execute the technical solutions in method embodiment 6. Specific implementation manners and technical effects are similar to those of the method, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An uplink control information transmission method, comprising:
   receiving, by user equipment (UE) in a downlink subframe N, a downlink control channel sent by a base station, wherein the downlink control channel is carried on a first serving cell of the UE; and
   sending, by the UE, a hybrid automatic repeat request-acknowledgement corresponding to the downlink control channel to the base station in an uplink subframe N+4 by using a physical uplink control channel (PUCCH), wherein when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, wherein a duplexing mode of the first serving cell is different from the duplexing mode of the second serving cell, a sum of a quantity of uplink subframes comprised in the first uplink subframe set and the quantity of uplink subframes comprised in the second uplink subframe set is equal to a quantity of subframes in a radio frame, and an uplink subframe comprised in the first uplink subframe set and the uplink subframe comprised in the second uplink subframe set correspond to different subframes in the radio frame.

2. The method according to claim 1, wherein when the duplexing mode of the first serving cell is time division duplexing (TDD) and the duplexing mode of the second serving cell is frequency division duplexing (FDD), the uplink subframe comprised in the second uplink subframe set corresponds to an uplink subframe, in a radio frame, of the first serving cell and the uplink subframe comprised in the first uplink subframe set corresponds to the other uplink subframe, except the uplink subframe comprised in the second uplink subframe set, in the radio frame; or
   when the duplexing mode of the first serving cell is FDD and the duplexing mode of the second serving cell is TDD, the uplink subframe comprised in the first uplink subframe set corresponds to an uplink subframe, in a radio frame, of the first serving cell and the uplink subframe comprised in the second uplink subframe set corresponds to the other uplink subframe, except the uplink subframe comprised in the first uplink subframe set, in the radio frame.

3. The method according to claim 1, wherein the downlink control channel is a physical downlink control channel (PDCCH) or an enhanced physical downlink control channel (EPDCCH), and the downlink control channel is used to indicate physical downlink shared channel (PDSCH) transmission carried on the first serving cell or is used to indicate downlink semi-persistent scheduling (SPS) releasing; and
   when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

4. The method according to claim 1, wherein before the sending, by the UE, a hybrid automatic repeat request-acknowledgement corresponding to the downlink control channel to the base station in an uplink subframe N+4 by using a PUCCH, the method further comprises:
   acquiring, by the UE, at least one of a PUCCH resource and a PUCCH transmit power of the PUCCH.

5. The method according to claim 4, wherein when the uplink subframe N+4 belongs to the first uplink subframe set, the acquiring, by the UE, a PUCCH resource of the PUCCH comprises:
   determining, by the UE, the PUCCH resource according to a transmit power control (TPC) command field in a downlink control information (DCI) format of the downlink control channel.

6. The method according to claim 4, wherein when the uplink subframe N+4 belongs to the second uplink subframe set, the acquiring, by the UE, a PUCCH transmit power of the PUCCH comprises:
   determining, by the UE, the PUCCH transmit power according to a TPC command field in a DCI format of the downlink control channel.

7. User equipment (UE), comprising:
   a memory; and
   a processor in communication with the memory, wherein the memory stores a group of program code, and the processor is configured to execute the program code stored in the memory to perform:
   receiving, in a downlink subframe N, a downlink control channel sent by a base station, wherein the downlink control channel is carried on a first serving cell of the UE; and
   sending a hybrid automatic repeat request-acknowledgement corresponding to the downlink control channel to the base station in an uplink subframe N+4 by using a physical uplink control channel (PUCCH), wherein when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, wherein a duplexing mode of the first serving cell is different from the duplexing mode of the second serving cell, a sum of a quantity of uplink subframes comprised in the first uplink subframe set and the quantity of uplink subframes comprised in the second uplink subframe set is equal to a quantity of subframes in a radio frame, and an uplink subframe comprised in the first uplink subframe set and the uplink subframe comprised in the second uplink subframe set correspond to different subframes in the radio frame.

8. The user equipment according to claim 7, wherein when the duplexing mode of the first serving cell is time division duplexing (TDD) and the duplexing mode of the second serving cell is frequency division duplexing (FDD), the uplink subframe comprised in the second uplink subframe set corresponds to an uplink subframe, in a radio frame, of the first serving cell and the uplink subframe comprised in the first uplink subframe set corresponds to the other uplink subframe, except the uplink subframe comprised in the second uplink subframe set, in the radio frame; or when the duplexing mode of the first serving cell is FDD and the duplexing mode of the second serving cell is TDD, the uplink subframe comprised in the first uplink subframe set corresponds to an uplink subframe, in a radio frame, of the first serving cell and the uplink subframe comprised in the second uplink subframe set corresponds to the other uplink subframe, except the uplink subframe comprised in the first uplink subframe set, in the radio frame.

9. The user equipment according claim 7, wherein the downlink control channel is a physical downlink control channel (PDCCH) or an enhanced physical downlink control channel (EPDCCH), and the downlink control channel is used to indicate physical downlink shared channel (PDSCH) transmission carried on the first serving cell or is used to indicate downlink semi-persistent scheduling (SPS) releasing; and when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

10. The user equipment according to claim 7, wherein the operations further comprising:

acquiring at least one of a PUCCH resource and a PUCCH transmit power of the PUCCH.

11. The user equipment according to claim 10, wherein when the uplink subframe N+4 belongs to the first uplink subframe set, the operations further comprising:

determining the PUCCH resource according to a transmit power control (TPC) command field in a downlink control information (DCI) format of the downlink control channel.

12. The user equipment according to claim 11, wherein when the uplink subframe N+4 belongs to the second uplink subframe set, the operations further comprising:

determining the PUCCH transmit power according to the TPC command field in the DCI format of the downlink control channel.

13. A base station, comprising:

a memory and a processor in communication with the memory, wherein the memory stores a group of program code, and the processor is configured to execute the program code stored in the memory to perform:

sending a downlink control channel to user equipment (UE) in a downlink subframe N, wherein the downlink control channel is carried on a first serving cell of the UE; and receiving, in an uplink subframe N+4, a hybrid automatic repeat request-acknowledgement that is sent by the UE by using a physical uplink control channel (PUCCH) and corresponds to the downlink control channel, wherein when the uplink subframe N+4 belongs to a first uplink subframe set, the PUCCH is carried on a second serving cell of the UE, and when the uplink subframe N+4 belongs to a second uplink subframe set, the PUCCH is carried on the first serving cell, wherein a duplexing mode of the first serving cell is different from the duplexing mode of the second serving cell, a sum of a quantity of uplink subframes comprised in the first uplink subframe set and the quantity of uplink subframes comprised in the second uplink subframe set is equal to a quantity of subframes in a radio frame, and an uplink subframe comprised in the first uplink subframe set and the uplink subframe comprised in the second uplink subframe set correspond to different subframes in the radio frame.

14. The base station according to claim 13, wherein when the duplexing mode of the first serving cell is time division duplexing (TDD) and the duplexing mode of the second serving cell is frequency division duplexing (FDD), the uplink subframe comprised in the second uplink subframe set corresponds to an uplink subframe, in a radio frame, of the first serving cell and the uplink subframe comprised in the first uplink subframe set corresponds to the other uplink subframe, except the uplink subframe comprised in the second uplink subframe set, in the radio frame; or when the duplexing mode of the first serving cell is FDD and the duplexing mode of the second serving cell is TDD, the uplink subframe comprised in the first uplink subframe set corresponds to an uplink subframe, in a radio frame, of the first serving cell and the uplink subframe comprised in the second uplink subframe set corresponds to the other uplink subframe, except the uplink subframe comprised in the first uplink subframe set, in the radio frame.

15. The base station according to claim 13, wherein the downlink control channel is a physical downlink control channel (PDCCH) or an enhanced physical downlink control channel (EPDCCH), and the downlink control channel is used to indicate physical downlink shared channel PDSCH) transmission carried on the first serving cell or is used to indicate downlink semi-persistent scheduling (SPS) releasing; and when the downlink control channel is used to indicate the PDSCH transmission, the hybrid automatic repeat request-acknowledgement corresponding to the downlink control channel is specifically a hybrid automatic repeat request-acknowledgement of a PDSCH corresponding to the downlink control channel; and when the downlink control channel is used to indicate the SPS releasing, the hybrid automatic repeat request-acknowledgement corresponding to the downlink control channel is specifically a hybrid automatic repeat request-acknowledgement corresponding to the downlink control channel indicating the SPS releasing.

* * * * *

UNITED STATES PATENT AND TRADEMARK OFFICE
CERTIFICATE OF CORRECTION

PATENT NO. : 10,129,856 B2
APPLICATION NO. : 15/142442
DATED : November 13, 2018
INVENTOR(S) : Yan Cheng et al.

Page 1 of 1

It is certified that error appears in the above-identified patent and that said Letters Patent is hereby corrected as shown below:

In the Claims

Column 62, Line 62, In Claim 15, delete "PDSCH)", and insert -- (PDSCH) -- therefor.

Signed and Sealed this
Eighteenth Day of June, 2019

Andrei Iancu
*Director of the United States Patent and Trademark Office*